United States Patent

Kataoka

[11] Patent Number: 5,124,036
[45] Date of Patent: Jun. 23, 1992

[54] PRESSING DIAPHRAGM AND PRESSING FILTER PLATE PROVIDED WITH PRESSING DIAPHRAGM OF COMPRESSION TYPE FILTER PRESS

[75] Inventor: Atsushi Kataoka, Suita, Japan

[73] Assignee: Kurita Machinery Manufacturing Co., Ltd., Osaka, Japan

[21] Appl. No.: 646,547

[22] Filed: Jan. 29, 1991

[30] Foreign Application Priority Data

| Jan. 30, 1990 | [JP] | Japan | 2-21526 |
| Mar. 6, 1990 | [JP] | Japan | 2-53942 |
| Mar. 8, 1990 | [JP] | Japan | 2-57478 |

[51] Int. Cl.⁵ .............................................. B01D 25/12
[52] U.S. Cl. .................................. 210/231; 100/197; 100/211
[58] Field of Search ................. 210/231; 100/211, 197

[56] References Cited

U.S. PATENT DOCUMENTS

| 4,237,009 | 12/1980 | Kurita | 210/227 |
| 4,666,596 | 5/1987 | Oelbermann et al. | 210/231 |

FOREIGN PATENT DOCUMENTS

| 56-11928 | 3/1981 | Japan . |
| 1583198 | 1/1981 | United Kingdom . |
| 2069358 | 8/1981 | United Kingdom . |
| 2110104 | 6/1983 | United Kingdom . |

Primary Examiner—W. Gary Jones
Assistant Examiner—Matthew O. Savage
Attorney, Agent, or Firm—Wenderoth, Lind & Ponack

[57] ABSTRACT

A pressing diaphragm and a pressing filter plate of a compression type filter press in which a surface of a main body of a pressing filter plate is covered with the pressing diaphragm, include: a projection member provided on the surface; and a projection member mounting member capable of contacting the main body, provided in a rear surface at a position corresponding to the projection member, and for mounting the projection member thereon with a fixture. The projection member has a plurality of pillar portions mounted on the projection member mounting member and fitted in a throughhole of the pressing diaphragm, a mounting hole penetrating through each of the pillar portions, and a long connecting plate portion for connecting the pillar portions with each other and regulating expansion of the pressing diaphragm fitted into a periphery of the pillar portions. The projection member mounting member has a mounting portion for mounting the fixture to be inserted into the mounting hole of each pillar portion of the projection member.

21 Claims, 23 Drawing Sheets

Fig. 11
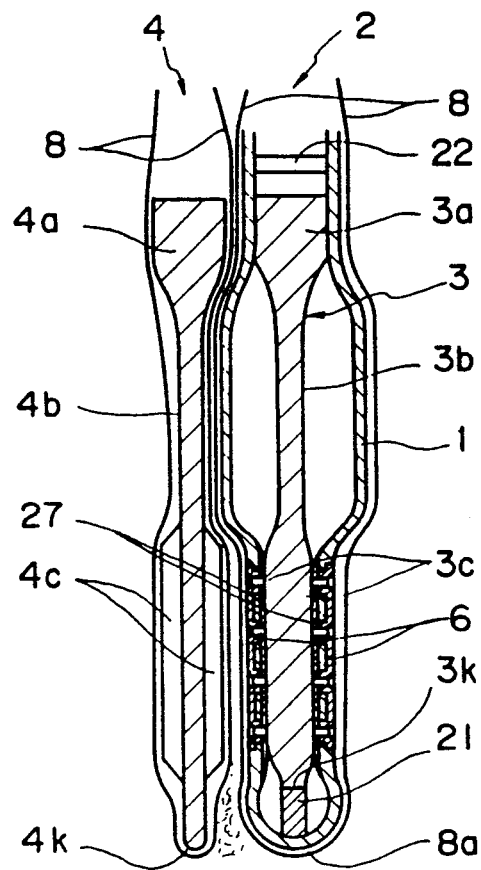
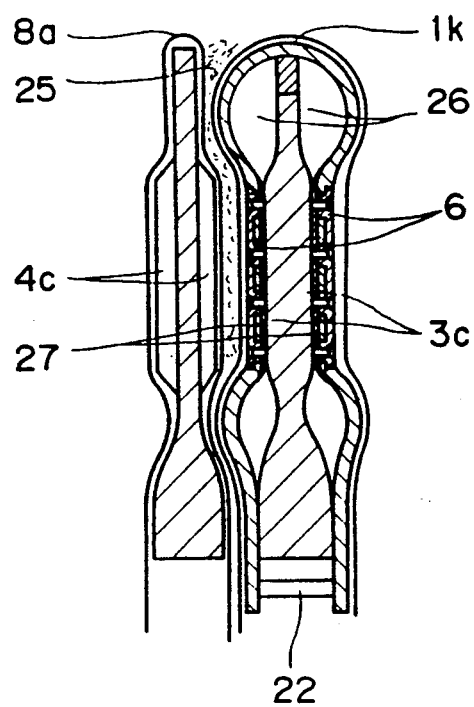

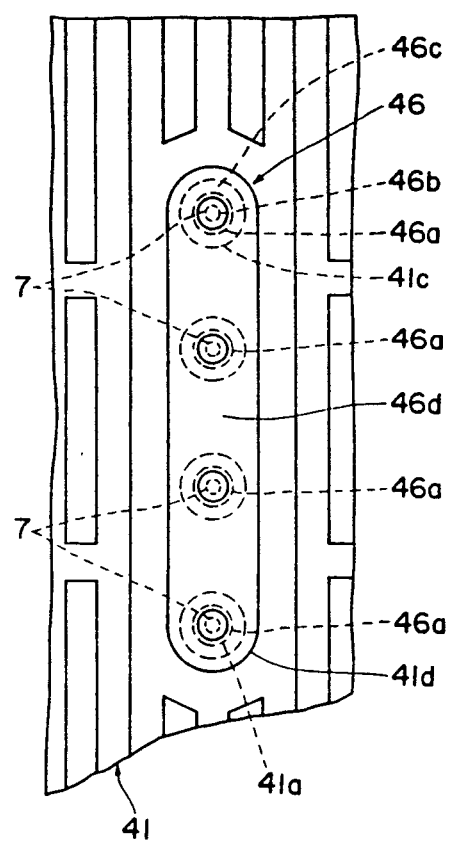
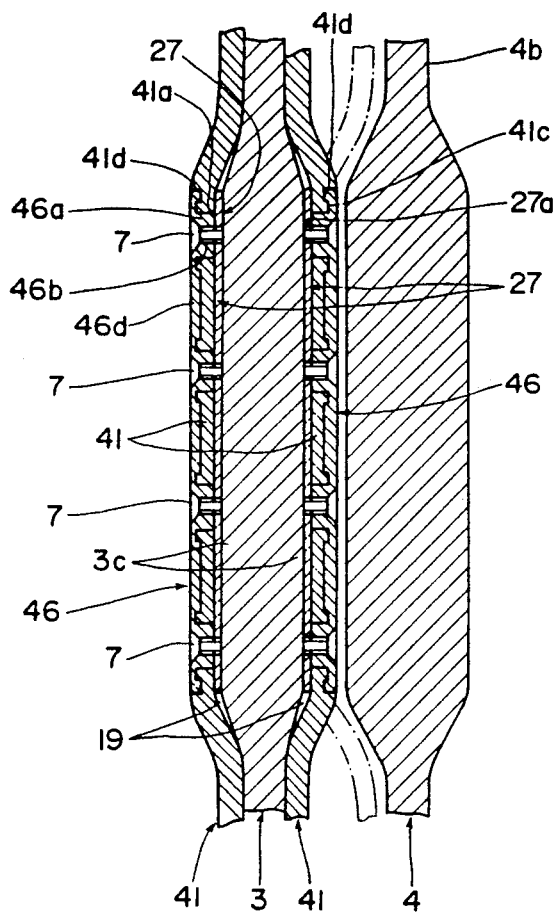
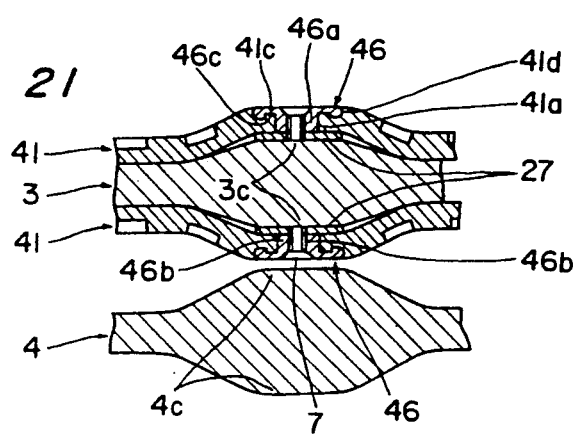

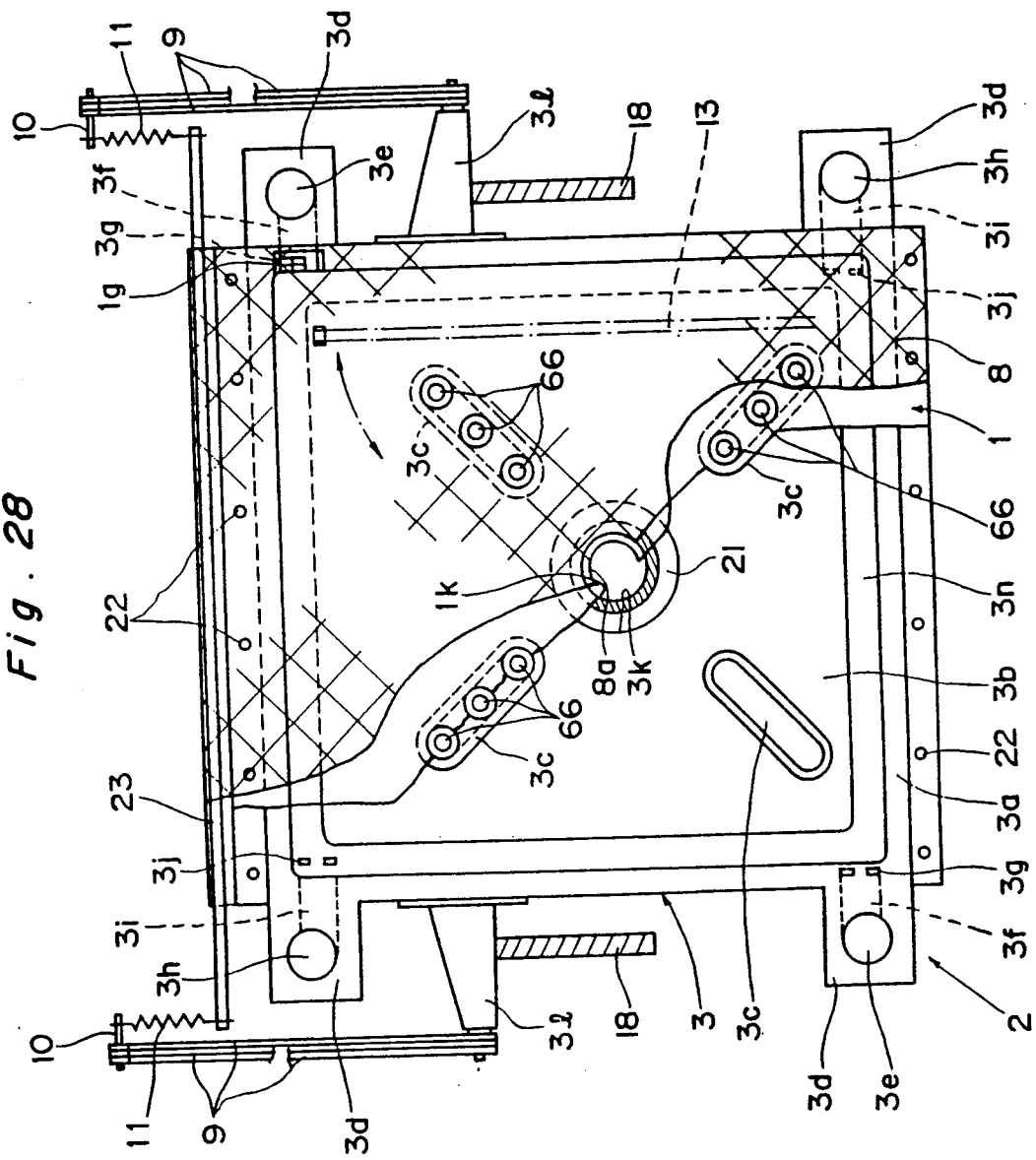

Fig. 30
Fig. 29
Fig. 31
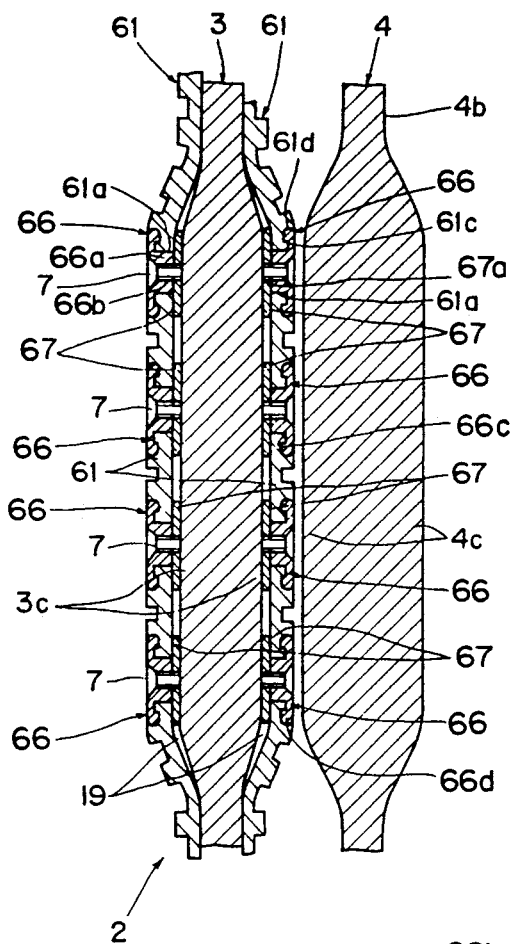
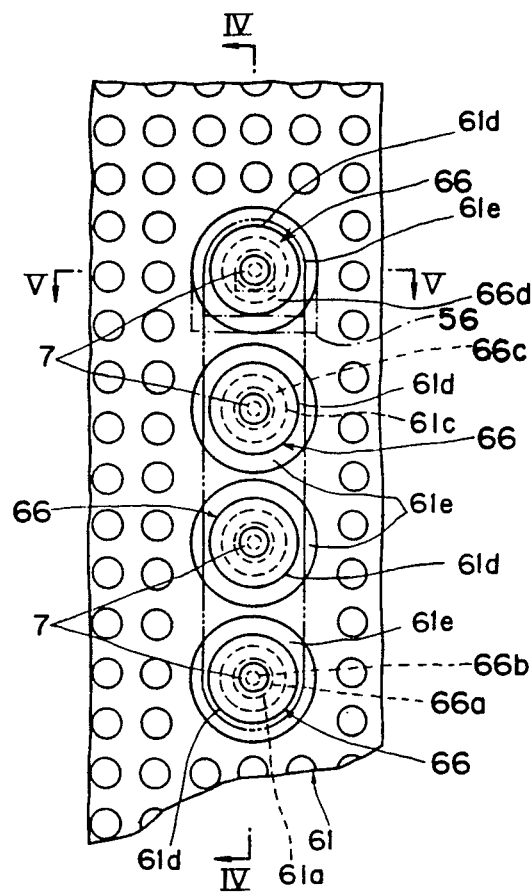
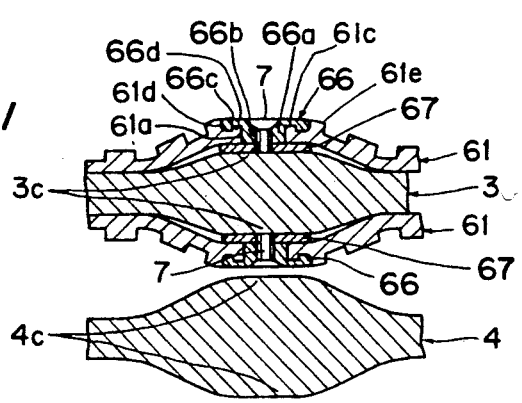

Fig. 36
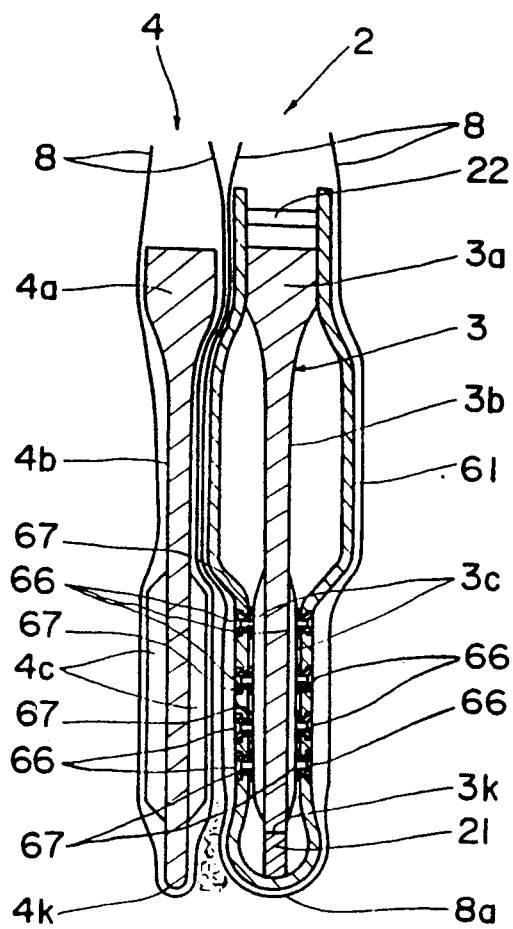
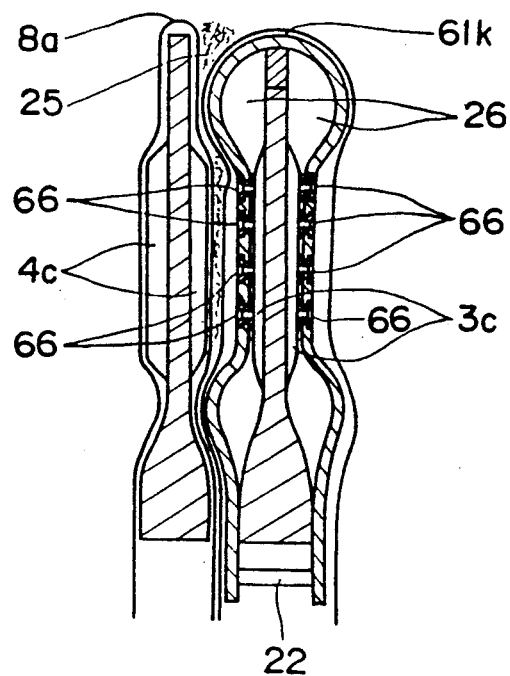

Fig. 52
Fig. 51
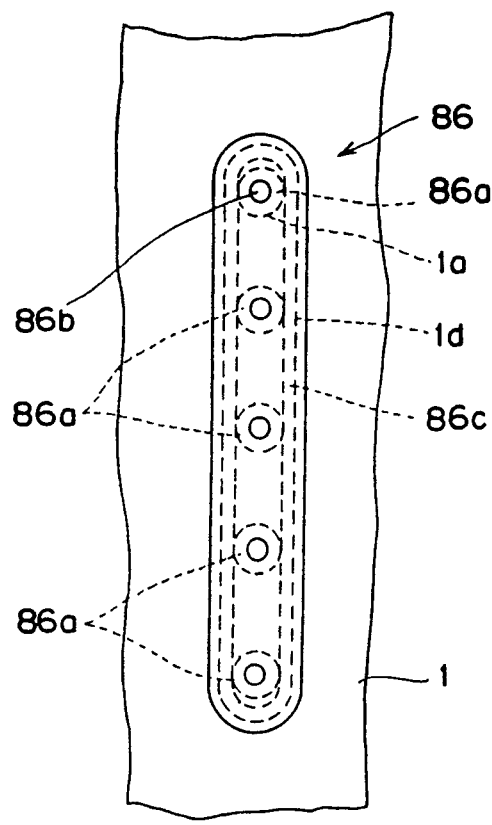
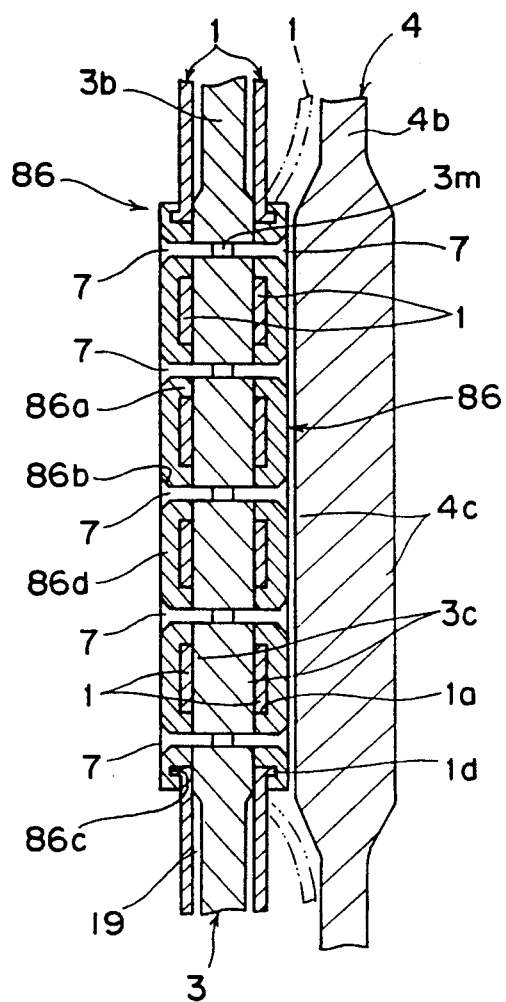
Fig. 53
Fig. 54
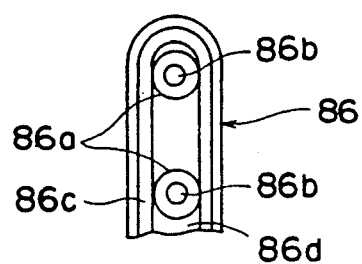
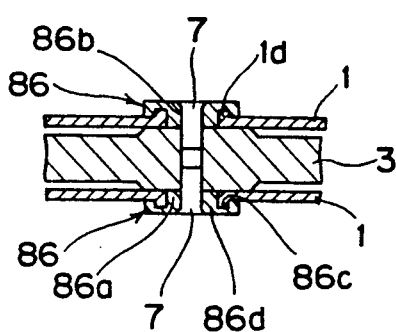

PRESSING DIAPHRAGM AND PRESSING FILTER PLATE PROVIDED WITH PRESSING DIAPHRAGM OF COMPRESSION TYPE FILTER PRESS

BACKGROUND OF THE INVENTION

The present invention relates to a pressing diaphragm provided with a projection member which helps maintain a predetermined gap between adjacent filter plates and supports the filtering face of a pressing filter plate, and also relates to the pressing filter plate provided with the pressing diaphragm.

Various conventional compression type of filter presses are known which carrying out filtration by holding a cake between a pair of filter cloths provided between a normal filter plate and a pressing filtering plate, and compressing the cake by expanding the pressing diaphragm of the pressing filter plate. According to one compression type of filter press (Japanese Utility Model Publication No. 56-11928), in mounting the pressing diaphragm on the pressing filter plate, a circular metallic plate is provided in the center of the pressing diaphragm and the metallic plate is fixed to the main body of the pressing filter plate with bolts.

According to the above-described construction, since the pressing diaphragm is fixed to the filter plate with the circular metallic plate, a load concentrates on the pressing diaphragm in the periphery of the circular metallic plate with the expansion of the pressing diaphragm, and as a result, the pressing diaphragm at the periphery of the metallic plate is likely to be damaged, i.e. is likely to crack.

Additionally, according to the above-described construction, the pressing diaphragm being fixed to a filter plate only by the above circular metallic plate can be compared to a large rubber film being held fixed by a small pin. When the rubber film expands in such a condition, a load concentrates on the film in the periphery of the pin. That is, with the expansion of the pressing diaphragm a load concentrates on the pressing diaphragm at the entire periphery of the circular metallic plate, and as a result, the pressing diaphragm at the periphery of the metallic plate is likely to be damaged, i.e. is like to crack.

SUMMARY OF THE INVENTION

In solving the first problem mentioned above in the prior art, the present inventor found that it is unnecessary to fix the metallic plates to the pressing filter plates. Therefore, the inventor devised a construction in which a projection member is fixed not to the pressing filter plate but to the pressing diaphragm so as to reduce a load on the pressing diaphragm.

Accordingly, an essential object of the present invention is to solve the first problem in the prior art and provide a pressing diaphragm and a pressing filter plate of a compression type filter press provided with a pressing diaphragm which will not crack.

In order to reduce the load on the pressing diaphragm and solve the second problem in the prior art, the present inventor found that the circular metallic plate causes a load to concentrate on the pressing diaphragm because the portion of the pressing diaphragm at the entire periphery of the circular expands metallic plate expands. Therefore, the present inventor devised a constructions comprising a plurality of pillars connected with each other by a long connecting plate which allows only a portion of the pressing diaphragm at parts of the peripheries of the pillars to expand, i.e., the remaining portion of the pressing diaphragm is not allowed to expand by the long connecting plate.

Accordingly, another important object of the present invention is to solve the second problem in the prior art and provide a pressing filter plate of a compression type of filter press with a pressing diaphragm which won't crack.

In accomplishing these and others objects, according to a first aspect of the present invention, there is provided a pressing diaphragm of a compression type of filter press for covering a main body of a pressing filter plate, the pressing diaphragm comprising: a pressing membrane, a projection member provided on a front surface of the membrane; and a projection member mounting plate provided on a rear surface of the membrane at a position corresponding to that of the projection member, and mounting the projection member to the membrane; the projection member having a plurality of pillars mounted on the projection member mounting plate and extending through the through-holes of the pressing diaphragm, respectively, a mounting hole extending through each of the pillars, and a long connecting plate connecting the pillars with each other and regulating expansion of portions of the pressing membrane located adjacent the periphery of the pillars; the projection member mounting plate having a mounting portion receiving a fixture inserted through the mounting hole of each of the pillars of the projection member.

According to a second aspect of the present invention, there is provided a pressing filter plate of a compression type of filter press, comprising: a main filter plate body covered by a pressing diaphragm, the pressing diaphragm including a pressing membrane, a projection member provided on a surface of the membrane and having a plurality of pillars extending through through-holes in the pressing membrane, a mounting hole extending through each of the pillars, and a long connecting plate connecting the pillars with each other and regulating expansion of portions of the pressing membrane adjacent the periphery of the pillars.

According to a third aspect of the present invention, in a pressing filter plate of a compression type of filter press similar to that described above, a projection member mounting plate contacts the main filter plate body, is positioned at a rear surface of the pressing membrane in correspondence with the position of the projection member, and mounts the projection member to the pressing membrane along with a fixture, such that the projection member and projection member mounting plate sandwich the pressing membrane therebetween; the pillars of the projection member being mounted on the projection member mounting plate, and the projection member mounting plate having a mounting portion for receiving the fixture extending through the mounting hole of each pillar of the projection member.

Owing to the above structural aspects of the present invention, the following advantages can be obtained.

Because the projection member is not mounted on the pressing filter plate main body, but on the pressing membrane, the projection member is capable of freely moving with respect to the pressing filter plate main body with the expansion of the pressing diaphragm without influencing the expansion of the pressing diaphragm. Accordingly, a sudden increase of a load on the pressing diaphragm in the vicinity of the projection member is suppressed when the pressing diaphragm expands, and therefore, the pressing membrane can be effectively prevented from cracking. And, when the filter plates are clamped and a force is applied from an adjacent filter plate to the pressing diaphragm, the force is applied to the projection member and the projection member mounting plate via the pillars and is hardly applied to the pressing membrane. Accordingly, the damage of the pressing membrane can be effectively prevented when the filter plate is clamped. In addition, since the pressing filter plate main body is not required to be provided with a mounting hole, the main body can be manufactured rather easily.

According to a fourth aspect of the present invention, there is provided a pressing diaphragm of a compression type of filter press similar to that described above, wherein the projection member has a pillar with a mounting hole therethrough, a flange extending around the pillar, an engaging portion tightly engaging an engaging portion formed on the pressing membrane in the periphery of the through-hole, and a projection member mounting plate having a mounting portion for receiving a fixture extending through the mounting hole of the pillar.

According to a fifth aspect of the present invention, there is provided a pressing filter plate of a compression type of filter press, comprising: a main filter plate body covered with a pressing membrane having a through-hole therethrough; a projection member provided on a surface of the membrane and having a pillar extending through the through-hole of the pressing membrane, a flange extending around the pillar, a mounting hole extending through the pillar, and an engaging portion tightly engaging an engaging portion formed in the pressing membrane around the periphery of the through-hole; and a projection member mounting plate having a mounting portion for receiving a fixture inserted through the mounting hole of the pillar.

Owing to the above structural aspects of the present invention, the following advantages can be obtained.

Because each projection member is mounted on the pressing membrane by the projection member mounting plate and the fixture without the projection member being fixed to the pressing filter plate main body, the projection member is capable of freely moving together with the projection member mounting plate relative to the pressing filter plate main body without influencing the expansion of the pressing membrane. Accordingly, a sudden increase of a load on the pressing membrane in the vicinity of the projection member is suppressed when the pressing diaphragm expands, and therefore, the pressing membrane can be effectively prevented from cracking.

Even when a plurality of such projection members are mounted on the pressing membrane, each projection member is capable of individually moving with the expansion of the pressing diaphragm because adjacent projection members are spaced a certain interval from each other. Therefore, an overload is not applied to the pressing diaphragm. And, when the filter plates are clamped and a force is applied from an adjacent filter plate to the pressing diaphragm, the force is applied to the projection member and the projection member mounting plate via the pillar and is hardly applied to the pressing diaphragm. Accordingly, the damage of the pressing membrane can be effectively prevented when the filter plate is clamped. In addition, since the pressing filter plate main body is not required to be provided with a mounting hole, the main body can be manufactured rather easily.

According to a sixth aspect of the present invention, there is provided a pressing filter plate of a compression type of filter press, comprising: a pressing diaphragm covering the surface of a main filter plate body and fixed thereto by a projection member and fixture, wherein the projection member includes a plurality of pillar portions connected by a long plate, an engaging portion tightly engaging an engaging portion formed on the pressing membrane around through-holes therein through which the pillars extend, and wherein the fixture extends through a mounting hole in the projection member in fixing the projection member to the main filter plate body.

Owing to the above structural aspects of the present invention, the following advantages can be obtained.

Although the pressing diaphragm is fixed to the pressing filter plate main body by the projection member, only a portion of the pressing diaphragm expands and the expansion of the remaining portion of the pressing diaphragm is restricted by the long connecting plate. Accordingly, when the pressing diaphragm expands, a concentrated load on the pressing membrane in the vicinity of the projection member is suppressed, thus effectively preventing the pressing membrane from being cracked.

BRIEF DESCRIPTION OF THE DRAWINGS

These and other objects and features of the present invention will become clear from the following description taken in conjunction with the preferred embodiments thereof with reference to the accompanying drawings, in which:

FIG. 11 is a side elevation view, in section, of the principal portion of the filter press in which the filter plates are clamped;

FIGS. 19, 20 and 21 are, respectively, a front view of principal portions of another embodiment of a projection member and a projection member mounting plate mounted on a pressing membrane, and a side elevation view and a plan view, in section, of portions of a pressing filter plate with the projection member and the projection member mounting plate mounted thereon clamped to a normal filter plate;

FIG. 28 is a front view of another embodiment of a pressing filter plate of a compression type of filter press according to the present invention;

FIGS. 29, 30, and 31 are, respectively, a front view of a part of another embodiment of a projection member and a projection member mounting plate mounted on a pressing membrane, and a side elevation view and a plan view, in section, of portions of a pressing filter plate with the projection member and the projection member mounting plate mounted thereon clamped to a normal filter plate;

FIG. 36 is a side elevation view, partly in section, of a filter press in which the filter plates are clamped;

FIGS. 51, 52, 53, and 54 each show a modified form of a projection member wherein FIG. 51 is a front view of the projection member mounted on a pressing diaphragm, FIG. 52 is a side elevation sectional view of a filter plate having the projection member mounted thereon clamped to a normal filter plate, FIG. 53 is a cross-sectional view of the pressing filter plate having the projection member mounted thereon, and FIG. 54 is a rear view of the projection member.

DETAILED DESCRIPTION OF THE PREFERRED EMBODIMENTS

Figure 1:
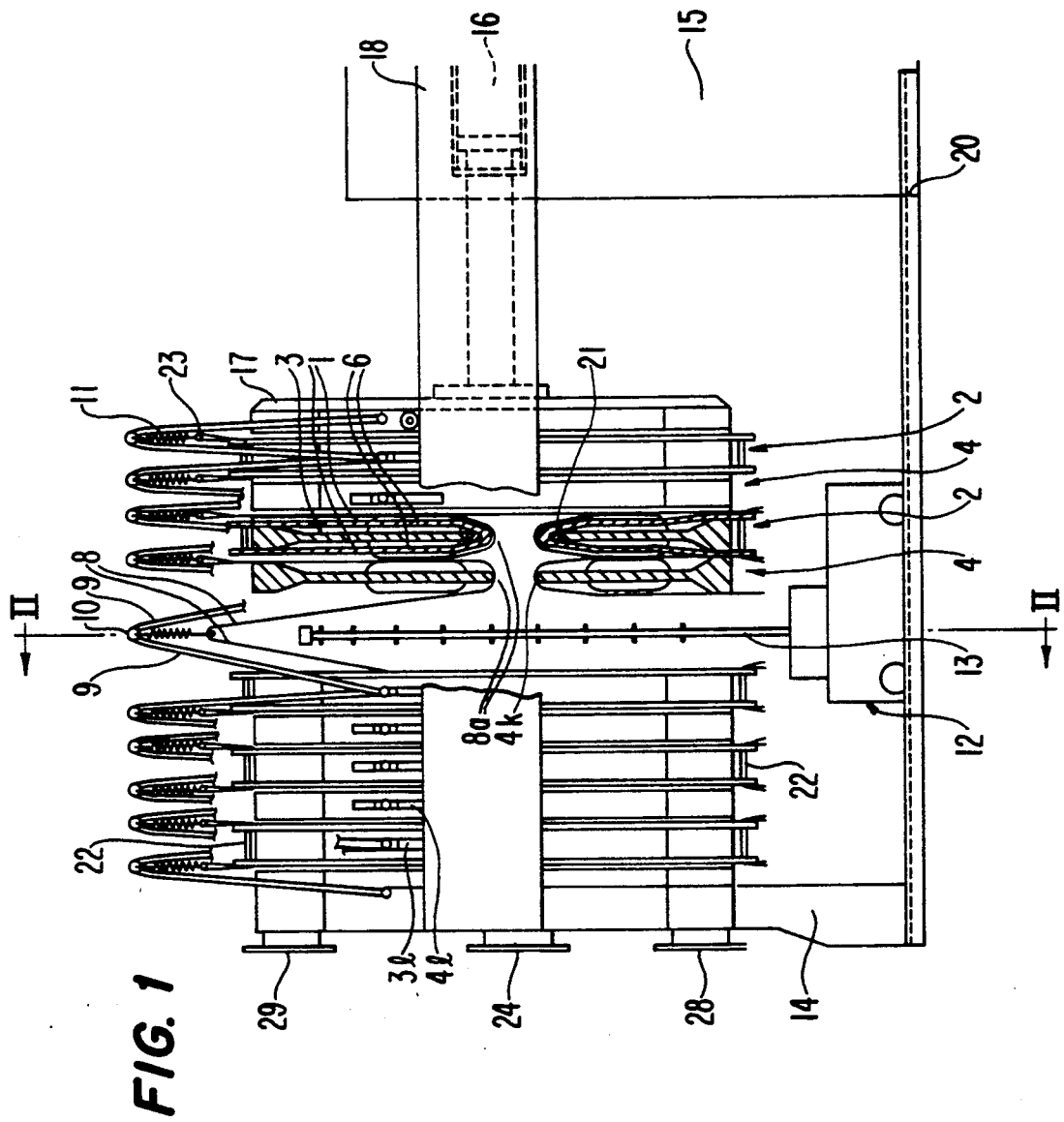
FIGS. 1 and 2 are a side elevation view, partly in section, of a compression type filter press according to an embodiment of the present invention, and a sectional view taken along line II—II of FIG. 1, respectively.

Before the description of the present invention proceeds, it is to be noted that like parts are designated by like reference numerals throughout the accompanying drawings.

Embodiments according to the present invention are described in detail with reference to FIGS. 1 through 27.

Figure 2:
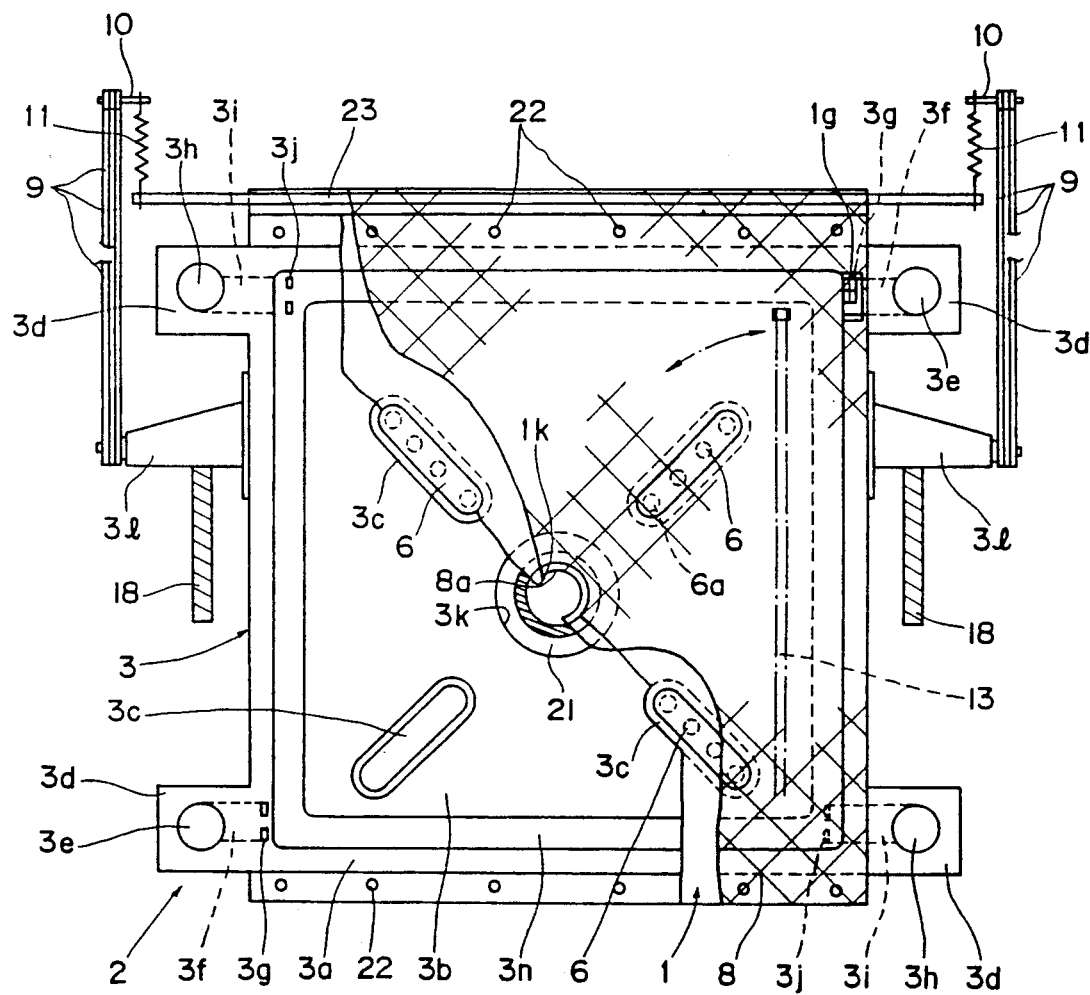

As shown in FIGS. 1 and 2, in a pressing type of filter press according to the present invention, pressing filter plates 2 and normal filter plates 4 are alternately arranged longitudinally between front and back stands 14 and 15, the pressing filter plates 2 and the filtering plates 4 are slidable with respect to a pair of guide rails 18, and a movable plate 17 is clamped to the front stand side by a driving device 16 provided in the rear stand 15. Slurry is supplied to a pair of filter cloths 8 arranged between the filter plates 2 and 4 so as to be filtered, and at the same time or thereafter, a pressing diaphragm 1 is expanded by supplying compressed fluid to the pressing filter plate 2 so as to effect compressive filtration.

In the pressing filter plate 2 (FIGS. 3-10), the front and rear surfaces of a square filter plate main body 3 are covered with a pair of the pressing diaphragms 1, projection members 6 are provided on the front surface of a pressing membrane of each pressing diaphragm 1, projection member mounting plates 27 serving as projection member mounting members are provided on the rear surface of a pressing membrane of each pressing diaphragm 1, and each projection member 6 is mounted on a projection member mounting plate 27 so that the projection members 6 and projection member mounting plates 27 sandwich the pressing membrane therebetween.

In the main body 3 (FIG. 2), an inclined face 3n is formed in a square outer frame 3a and a square filtering face 3b is formed inside the inclined face 3n. A laterally projecting ear 3d is formed integrally with each corner of the main body 3 and a through-hole 3e or 3h is formed in each ear 3d. The through-hole 3h of each ear 3d at the upper left and lower right corners of the main body 3 communicates with an opening 3j in the inclined face 3n of the main body 3 via a communicating passage 3i so as to constitute a compressed fluid supply passage communicating with a compressed fluid supply chamber 26 which will be described later. The through-hole 3e of each ear 3d at the lower left and upper right corners of the main body 3 communicates with an opening 3g in the outer frame 3a of the main body 3 via a communicating passage 3f so as to constitute a filtrate collecting passage. A laterally projecting grip 3l (FIGS. 1 and 2) is formed on each side of the main body 3 and each grip 3l is slidably mounted on each guide rail 18 extending in the longitudinal direction of the filter press so as to hangingly support each pressing filter plate 2 on the pair of guide rails 18. A slurry supply opening 3k is formed in the center of the filtering face 3b of the main body 3, and pairs of projecting portions 3c are formed on the filtering face 3b such that they are spaced a predetermined distance from the slurry supply opening 3k and are located along each of the diagonals of the filtering face 3b, respectively. Each projecting portion 3c has the configuration of an approximately rectangular plate and both ends thereof are curved. The projecting portion 3c allows the formation of a gap 19, between the rear surface of the pressing diaphragm 1 and the filtering face 3b except where the projecting portion 3c is formed, which communicates with the compressed fluid supply chamber 26 (refer to FIG. 11) so as to facilitate the supply of compressed fluid between the pressing diaphragm 1 and the main body 3. When the filter plates are clamped, the projecting portions 3c space the filtering faces 3b and 4b apart in cooperation with each projection member 6, projection member mounting plate 27, and projecting portion 4c of the filter plate 4 which will be described later, thus preventing the filtering faces 3b and 4b from breaking.

Figure 4:
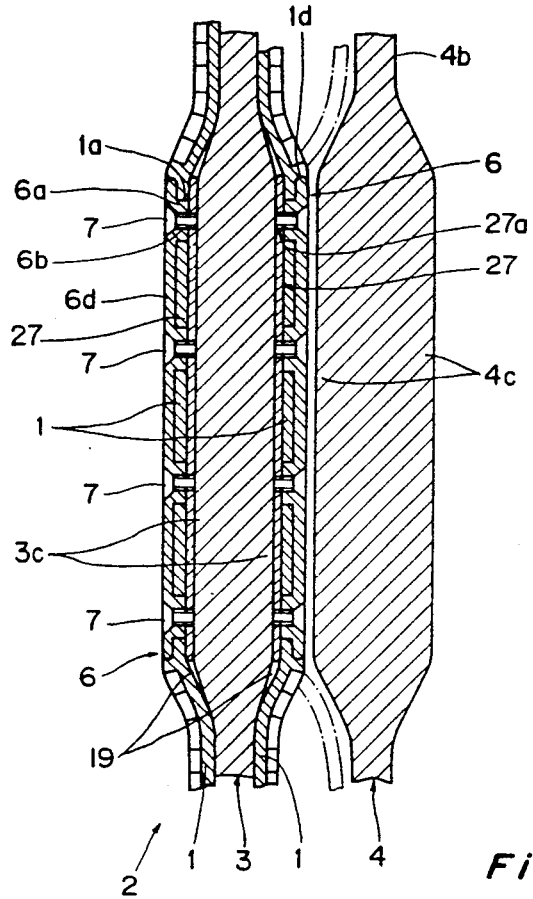
FIGS. 3, 4, and 5 are, respectively, a front view of principal portions of a projection member and a projection member mounting plate mounted on a pressing membrane, and a side elevation view and a plan view, in section, of portions of a pressing filter plate with the projection member and the projection member mounting plate mounted thereon clamped to a normal filter plate.
Figure 3:
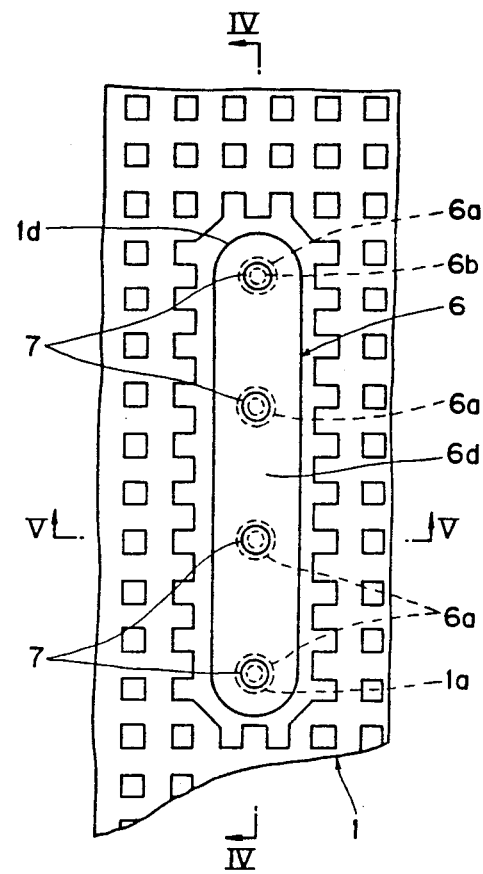
Figure 5:
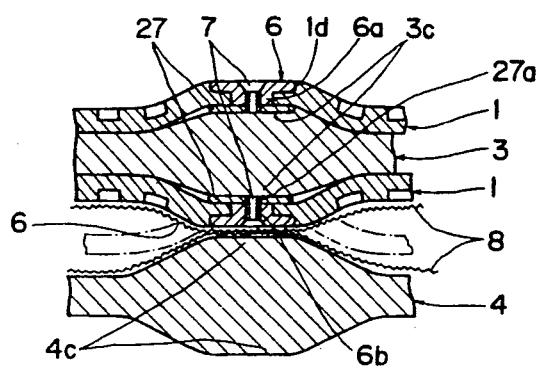
Figure 8:
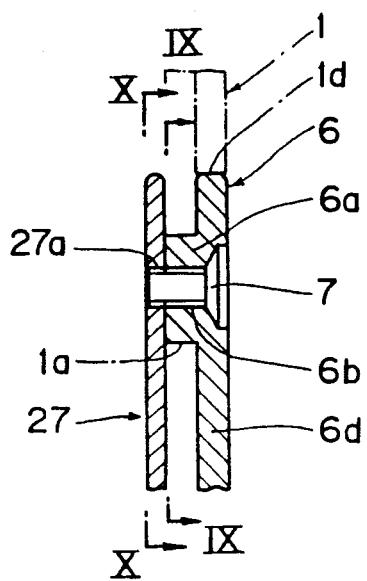
FIGS. 7 and 8 are sectional views, respectively, taken along line VII—VII of FIG. 6 and line VIII—VIII of FIG. 6.
Figure 6:
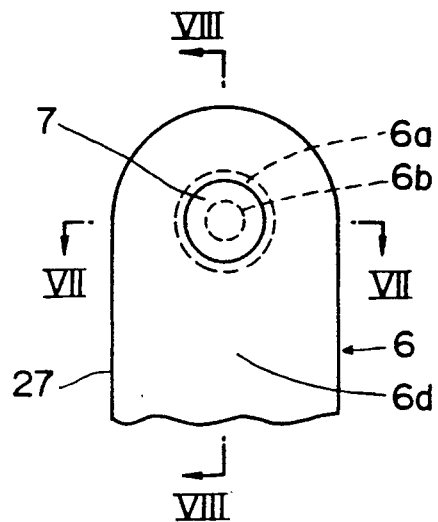
FIG. 6 is a plan view of a principal portion of the projection member and the projection member mounting plate mounted together with a bolt.
Figure 7:
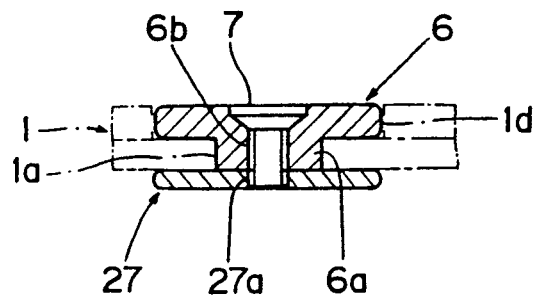
Figure 10:
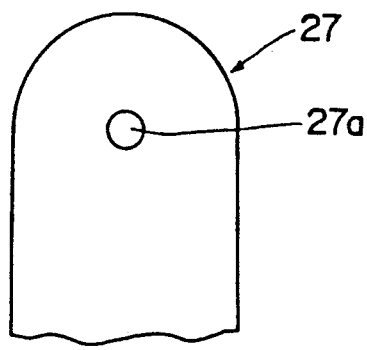
FIGS. 9 and 10 are a rear elevation view of the projection member as seen in the direction of arrows IX—IX of FIG. 8 and a rear elevation view of the projection member mounting plate as seen in the direction of arrows X—X of FIG. 8.
Figure 9:
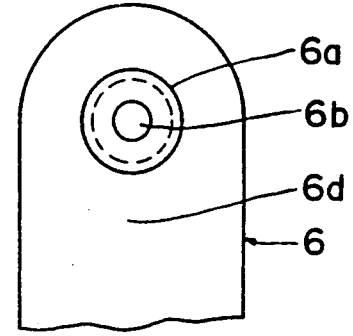

The membranes of the pair of pressing diaphragms 1 (FIG. 11) have irregularities on the surfaces thereof, are made of an elastic material such as rubber, cover the filtering faces 3b and inclined faces 3n formed in the front and rear surfaces of the main body 3, and are connected with each other at the upper and lower ends thereof by bolts 22. A ring 21 is mounted around the peripheral edge of the slurry supply opening 3k of the main body 3 to form, in the center of the pressing diaphragm 1, a slurry supply opening 1k concentric with the slurry supply opening 3k of the main body 3. The projection members 6 and the projection member mounting plates 27 are located a predetermined distance radially outwardly of the slurry supply opening 1k at positions 27 corresponding to the locations of the projecting portions 3c, respectively. As shown in FIGS. 3 through 5, the diaphragm 1 has a projection member fit-in concave portion 1d in which a projection member 6 is received. The projection member fit-in concave portion 1d has a flat configuration approximately similar to that of the projection member 6 and has four small through-holes 1a formed on the bottom surface thereof. A filtrate collecting opening 1g (FIG. 2) communicating with an opening 3g of the outer frame 3a of the main body 3 is formed in the pressing diaphragm 1 at the lower left and upper right corners thereof.

Preferably, each projection member 6 is made of a hard material, such as stainless steel or nylon and is approximately rectangular with both ends thereof being curved as shown in FIGS. 3 through 9. Preferably, the thickness of the projection member 6 is so determined that the surface of the projection member 6 almost coincides with that of the outer frame 3a of the main body 3 when the projection member 6 is fitted in the projection member fit-in concave portion 1d formed on the pressing diaphragm 1. Each projection member 6 comprises four cylindrical pillars 6a, a mounting hole 6b extending through the center of each pillar 6a, and a long connecting plate 6d which connects the pillars 6a with each other. Each pillar 6a is fitted in each circular through-hole 1a of the pressing diaphragm 1, thus contacting the surface of the projection member mounting plate 27. Since each pillar 6a is fitted in each through-hole 1a of the pressing diaphragm 1, preferably, when the filter plates are clamped, each pressing filter plate 2 is pressed by the adjacent normal filter plate 4, and the peripheral portion of each pillar 6a of the connecting plate 6d is capable of tightly contacting the peripheral surface defining each through-hole 1a of the pressing diaphragm 1.

As shown in FIGS. 4 through 8 and FIG. 10, the projection member mounting plate 27 has approximately the same flat configuration as the projection member 6 with both ends thereof being curved. A mounting hole 27a communicable with the mounting hole 6b of a pillar 6a of the projection member 6 is formed through the projection member mounting plate 27.

The projection member 6 is provided on the surface of each membrane of the pressing diaphragm 1 by fitting the projection member 6 in the projection member fit-in concave portion 1d of the diaphragm disposed at a location corresponding to that of the projecting portion 3c of the main body 3. The projection member mounting plate 27 is provided on the rear surface of each membrane of the pressing diaphragm 1 at a location corresponding to that of the projecting portion 3c of the main body 3. And a respective bolt 7, serving as a fixture, is inserted into the mounting hole 6b of each pillar 6a of the projection member 6 and is screwed into the mounting hole 27a of the projection member mount plate 27. Thus, the projection member 6 and the projection member mounting plate 27 are mounted on the pressing diaphragm 1 such that the pressing diaphragm 1 is sandwiched between the projection member 6 and the projection member mounting plate 27. At this time, although the pressing diaphragm 1 is sandwiched between the projection member 6 and the projection member mounting plate 27, the membrane of the pressing diaphragm 1 is not damaged by the bolt 7 because the membrane is not sandwiched between the portions of the projection member 6 and the projection member mounting plate 27 secured together with the bolt 7, namely, between the pillar 6a and the projection member mounting plate 27. The projection member mounting plate 27 contacts the projecting portion 3c of the main body 3 when the filter plates are clamped. The projection member mounting plate 27 can be reliably brought into contact with the projecting portion 3c by making the projecting portion 3c a little larger than the projection member mounting plate 27. The projection member 6 and the projection member mounting plate 27 are mounted on the membrane of the pressing diaphragm 1 with four bolts 7 in this embodiment; however, they can be mounted thereon with only the upper and lower bolts 7 as viewed in FIG. 4. Preferably, the projection members 6 and the projection member mounting plates 27 are positioned around the periphery of the slurry supply opening 3k of the filtering face 3b of the main body 3 in a well-balanced arrangement.

In the normal filter plate 4 (FIG. 11), an inclined face is formed to the inside of a square plate-shaped outer frame 4a and a square filtering face 4b is bounded by the inclined face. Similar to the pressing filter plate main body 3, a respective laterally projecting ear (not shown) is formed integrally with the filter plate 4 at each corner thereof and a through-hole is formed in each ear. The through-hole in each ear at the lower left and upper right corners of the filter plate 4 are connected with the opening defined by the filtering face 4b, in the vicinity of the outer frame 4a of the normal filter plate 4 through a connecting passage constituting a filtrate collecting passage communicating with the through-hole of the ear of the normal filter plate 4. A laterally projecting grip 4l (FIG. 1) is formed on each side of the normal filter plate 4l and each grip 4l is slidably mounted on a respective guide rail 18 extending in the longitudinal direction of the filter press so as to hangingly support each normal filter plate 4 on the pair of the guide rails 18. A slurry supply opening 4k (FIG. 11) is formed in the center of the filtering face 4b of the filter plate 4, and pairs of projecting portions 4c are spaced a predetermined distance from the periphery of the slurry supply opening 4k with the pairs of the projecting portions 4c respectively located along each diagonal of the square filtering face 4b. Each projecting portion 4c is approximately rectangular, is disposed in opposition to a projection member 6 and both ends thereof are curved. When the filter plates 2 and 4 are clamped, each projection member 6 mounted on the membrane of each pressing diaphragm 1 through a projection member mounting plate 27 contacts the projecting portion 4c of the normal filter plate 4 via the filter cloths 8 so as to keep a predetermined space between the filtering faces 3b and 4b of the filter plates 2 and 4 adjacent to each other and so as to support the filtering faces 2b and 4b so that they are not damaged when the filter plates are clamped or compressed fluid is supplied.

According to the above construction, the pressing filter plate 2 and the normal filtering plate 4 are driven by the driving device 16, through the movement of the movable plate 17 toward the front stand, so as to be clamped together. In this clamped condition, the projection member mounting plate 27 contacts the projecting portion 3c of the main body 3, and the projection member 6 mounted in the pressing diaphragm 1 in opposition to the projection member mounting plate 27 contacts the adjacent projecting portion 4c of the normal filter plate 4 through the pair of filter cloths 8 (FIG. 5). As shown in FIG. 2, the projection members 6 and the projection member mounting plates 27 are provided on the diagonals of the filtering face 3b in a well-balanced and symmetrical arrangement with respect to both sides of the main body 3, so that when the adjacent filter plates 2 and 4 are clamped (FIG. 1), an approximately uniform clamping force acts on the filtering faces 3b and 4b. In the above clamped condition, a slurry to be filtered is supplied from a slurry supply pipe 24 of the front stand 14 to the space between the pair of the filter cloths 8 through the slurry supply openings 3k and 4k of each filter plate 2 and 4. After a slurry supply operation is carried out for a predetermined period of time or to supply a predetermined amount of slurry, compressed fluid, for example, compressed air is supplied from the supply pipe to the pressing filter plate 2 through the supply passage of the compressed fluid, thus resulting in the expansion of the pressing diaphragm 1. That is, as shown in FIG. 11, compressed fluid is supplied to the compressed fluid supply chamber 26 defined between the pressing diaphragm 1 and the main body 3, resulting in the expansion of the pressing diaphragm 1. At this time, the projection member 6 and the projection member mounting plate 27 mounted in the pressing diaphragm 1 are capable of moving with respect to the main body 3 with the expansion of the pressing diaphragm 1. Due to the expansion of the pressing diaphragm 1, a cake held between both filter cloths 8 is compressively filtered. The filtrate discharged during the above filtration and compressive filtration steps is collected in the filtrate collecting passage and then, discharged from a filtrate collecting pipe 28. When a predetermined filtering operation ends, the movable plate 17 is moved to the rear stand by the driving device 16; then, the filter plates 2 and 4 are individually opened to drop the cake held between the filter cloths 8 for facilitating the collection of the cake. As shown in FIG. 1, each filter cloth 8 is supported by a filter cloth hanging bar 23 suspended by a spring 11 mounted on a pin 10 which connects the upper ends of arms 9, the lower ends of which are pivotally mounted on the grips 3l and 4l of the filter plates 2 and 4. The filter cloths 8 are vibrated by the vibration of the filter plates 2 and 4 which occurs when the plates are opened or by a vibration imparting device (not shown), and as a result, the cake separates from the filter cloths 8 and drops therefrom. After the cake is collected, the filter cloths 8 are washed by pivoting the washing tube 13, of a washing device 12 which moves longitudinally along a rail 20, about the lower end thereof to the position shown by the one-dot chain line of FIG. 2. When the washing operation has been terminated, the filter plates 2 and 4 are clamped again in preparation for the subsequent filtering operation.

According to the above embodiment, the projection member 6 comprises a plurality of the pillars 6a connected with each other by the long connecting plate 6d, and the projection member 6 is mounted on the membrane of the pressing diaphragm 1 by the projection member mounting plate 27 and the bolts 7 in such a manner that the membrane is sandwiched between the projection member 6 and the projecting member mounting plate 27, and the projection member 6 is not fixed to the pressing filter plate main body 3. Consequently, with the expansion of the pressing diaphragm 1, the projection member 6 is capable of freely moving with respect to the pressing filter plate main body 3 without restricting the expansion of the pressing diaphragm 1. Therefore, when the pressing diaphragm 1 expands, the sudden increase of a load on the pressing diaphragm 1 in the vicinity of the projection member is suppressed, so that the cracking of the membrane of the pressing diaphragm 1 can be effectively prevented. Specifically, each pillar 6a is inserted into each through-hole 1a of the pressing diaphragm 1 and the projection member 6 is mounted on the projection member mounting plate 27 with the bolts 7 so that the membrane of the pressing diaphragm 1 is sandwiched between the projection member 6 and projection member mounting plate 27. As a result, when the filter plates are clamped, even though pressure is applied from the adjacent filter plate 4 to the pressing diaphragm 1, the pressure acts on the projection member 6 and the projection member mounting plate 27 via the pillars 6a while the pressure hardly acts on the membrane of the pressing diaphragm 1. Accordingly, when clamping the filter plates, damage to the pressing diaphragm 1 can be effectively prevented. Since the projecting portions 3c and 4c and the projection member 6 are disposed radially with respect to the slurry supply openings 3k and 4k toward the corners of the filtering faces 3b and 4b, the slurry can be smoothly supplied to the corners of the filtering faces 3b and 4b. Further, since the pressing filter plate main body 3 is not required to be provided with a mounting hole for mounting the projection member 6, the pressing filter plate main body 3 can be manufactured rather easily.

The present invention is not limited to the above embodiment, but can be embodied in various other ways.

Figure 12:
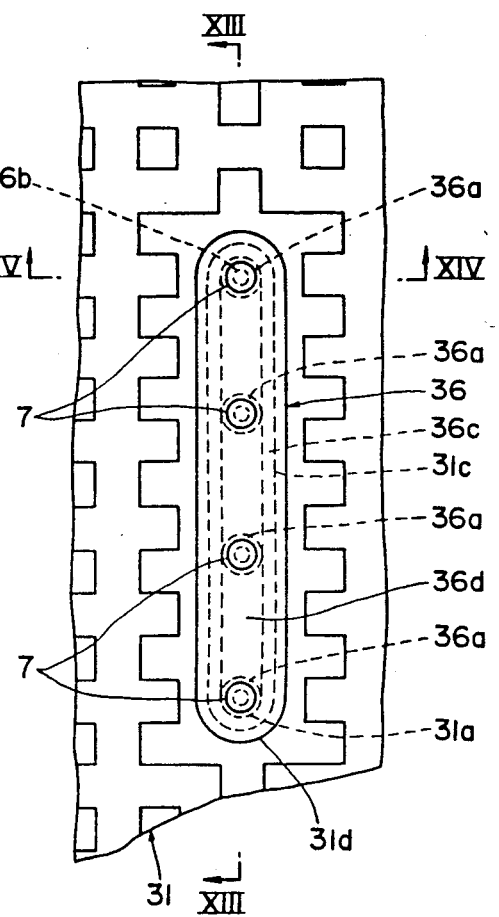
FIGS. 12, 13, and 14 are, respectively, a front view of principal portions of another of a projection member and a projection member mounting plate mounted on a pressing membrane, and a side elevation view and a plan view, in section, of portions of a pressing filter plate with the projection member and the projection member mounting plate mounted thereon clamped to a normal filter plate.
Figure 13:
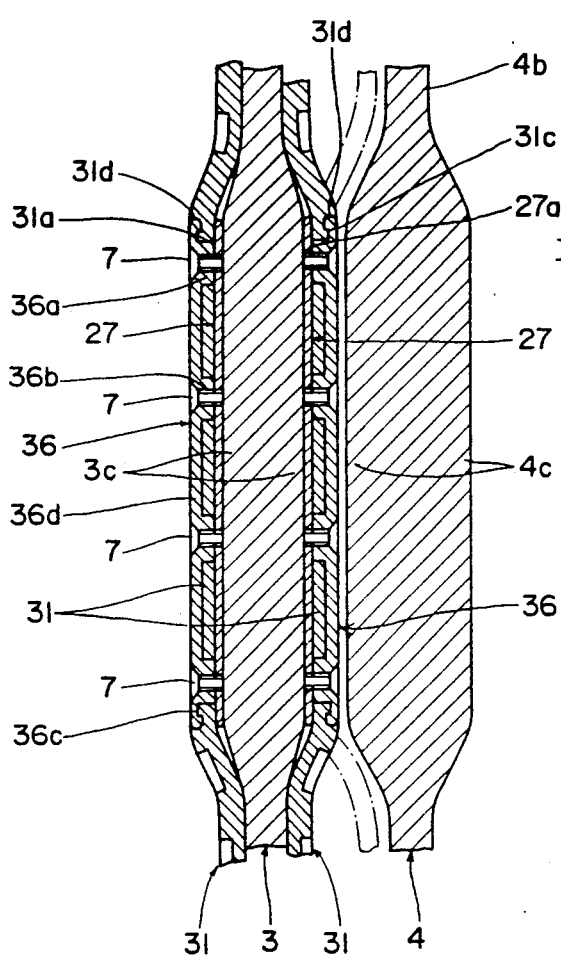
Figure 14:
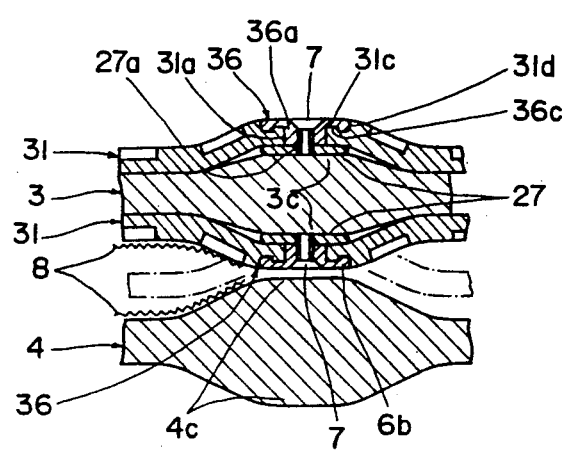
Figure 17:
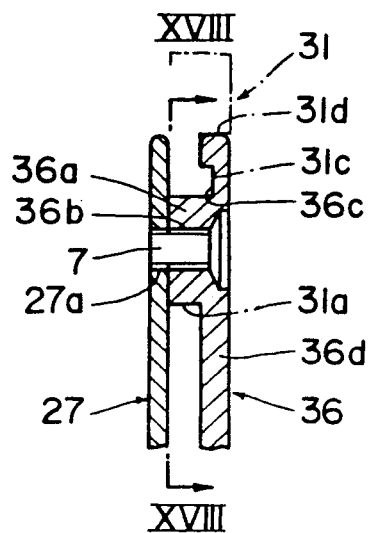
FIGS. 16 and 17 are sectional views, respectively, taken along line XVI—XVI of FIG. 15 and line XVII—XVII of FIG. 15.
Figure 15:
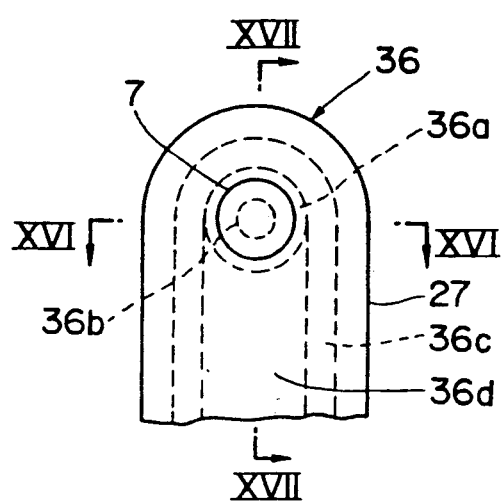
FIG. 15 is a front view of a principal portion of the projection member and the projection member mounting plate mounted together with a bolt.
Figure 16:
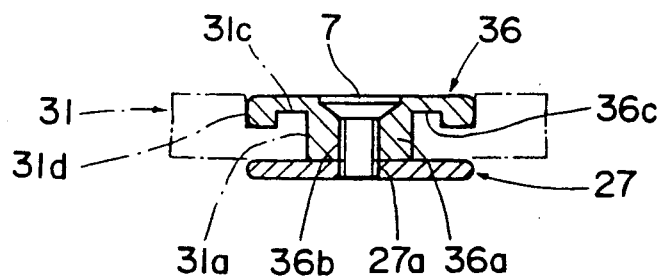
Figure 18:
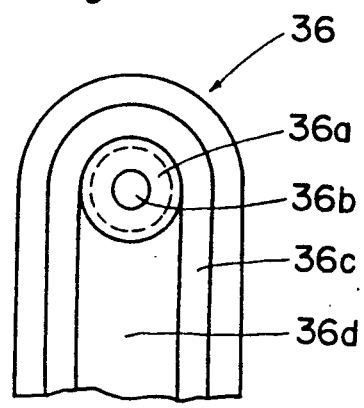
FIG. 18 is a rear elevation view of the projection member as seen in the direction of arrows XVII—XVII of FIG. 17.
Figure 24:
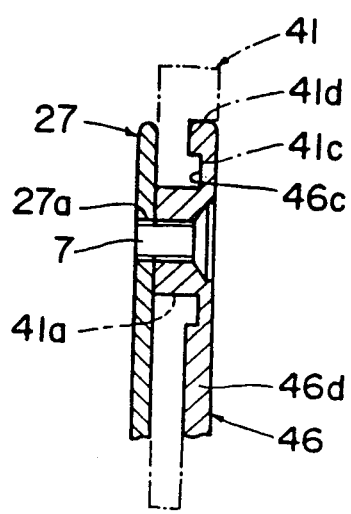
FIGS. 23 and 24 are cross-sectional and longitudinal sectional views of the principal portion of the projection member and the projection member mounting plate shown in FIG. 22.
Figure 22:
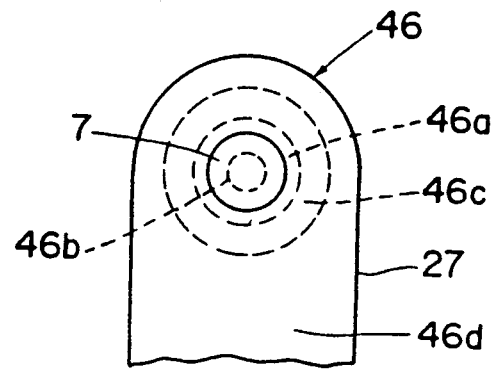
FIG. 22 is a plan view of a principal portion of the projection member and the projection member mounting plate mounted together with bolts.
Figure 23:
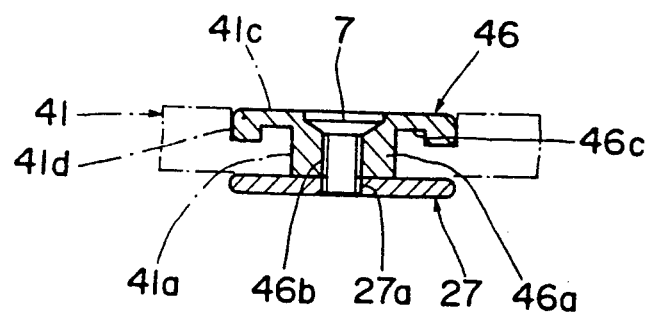
Figure 25:
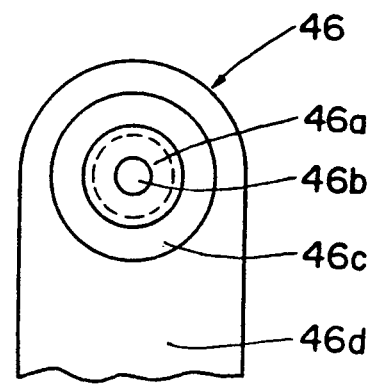
FIG. 25 is a bottom view of the principal portion of the projection member shown in FIG. 22.

For example, as shown in FIGS. 12 through 18, in order to cause each projection member 6 to tightly contact the membrane of the pressing diaphragm 1, one engaging concave portion 36c can be formed along the periphery of an arbitrary number of pillars, for example, four pillars. In this projection member 36, a pillar 36a, a mounting hole 36b, and a connecting plate 36d correspond to the pillar 6a, the mounting hole 6b, and the connecting plate 6d of the projection member 6, respectively. In the pressing diaphragm 31, a through-hole 31a and a projection member fit-in concave portion 31d correspond to the through-hole 1a and the projection member fit-in concave portion 1d of the pressing diaphragm 1, respectively. The engaging concave portion 36c extends along the periphery of the projection member 36 in an approximately rectangular path with upper and lower end portions thereof curved as shown in FIG. 12 and frames the four pillars 36a of the projection member 36. In correspondence with the engaging concave portion 36c, an engaging portion in the form of a projection 31c approximately rectangular but curved at both upper and lower end portions thereof as shown in FIG. 12 surrounds the four through-holes 31a of the pressing diaphragm 31. The engaging projection 31c formed on the pressing diaphragm 31 is capable of tightly contacting the engaging concave portion 36c of the projection member 36, so that the leakage of the filtrate from the front surface to rear surface of the pressing diaphragm 1 or the leakage of the compressed fluid from the rear surface to front surface thereof can be effectively prevented. Similar to the projection member 6, the projection member 36 is mounted on the membrane of the pressing diaphragm 1 by means of the projection member mounting plate 27 and the bolts 7, thus displaying an effect similar to that of the projection member 6.

As shown in FIGS. 19 through 25, an engaging concave portion 46c extends along the periphery of each pillar 46a in order to allow each projection member 46 to contact the membrane of the pressing diaphragm 1 tightly. In this projection member 46, a pillar 46a, a mounting hole 46b, and a connecting plate 46d correspond to the pillar 6a, the mounting hole 6b, and the connecting plate 6d of the projection member 6, respectively. In a pressing diaphragm 41, a through-hole 41a and a projection member fit-in concave portion 41d correspond to the through-hole 1a and the projection member fit-in concave portion 1d of the pressing diaphragm 1, respectively. Each engaging concave portion 46c extends in a circular path around the periphery of each pillar 46a. In correspondence with the engaging concave portion 46c, a circular engaging projecting portion 41c surrounds the periphery of each through-hole 41a. The engaging projection 41c formed on the pressing diaphragm 41 tightly contacts the engaging concave portion 46c of the projection member 46, so that the leakage of the filtrate from the front surface to the rear surface of the pressing diaphragm 1 or the leakage of the compressed fluid from the rear surface to front surface thereof can be effectively prevented. Similar to the projection member 6, the projection member 46 is mounted on the membrane of the pressing member 6 by means of the projection member mounting plate 27 and the bolts 7, thus displaying an effect similar to that of the projection member 6.

Figure 26:
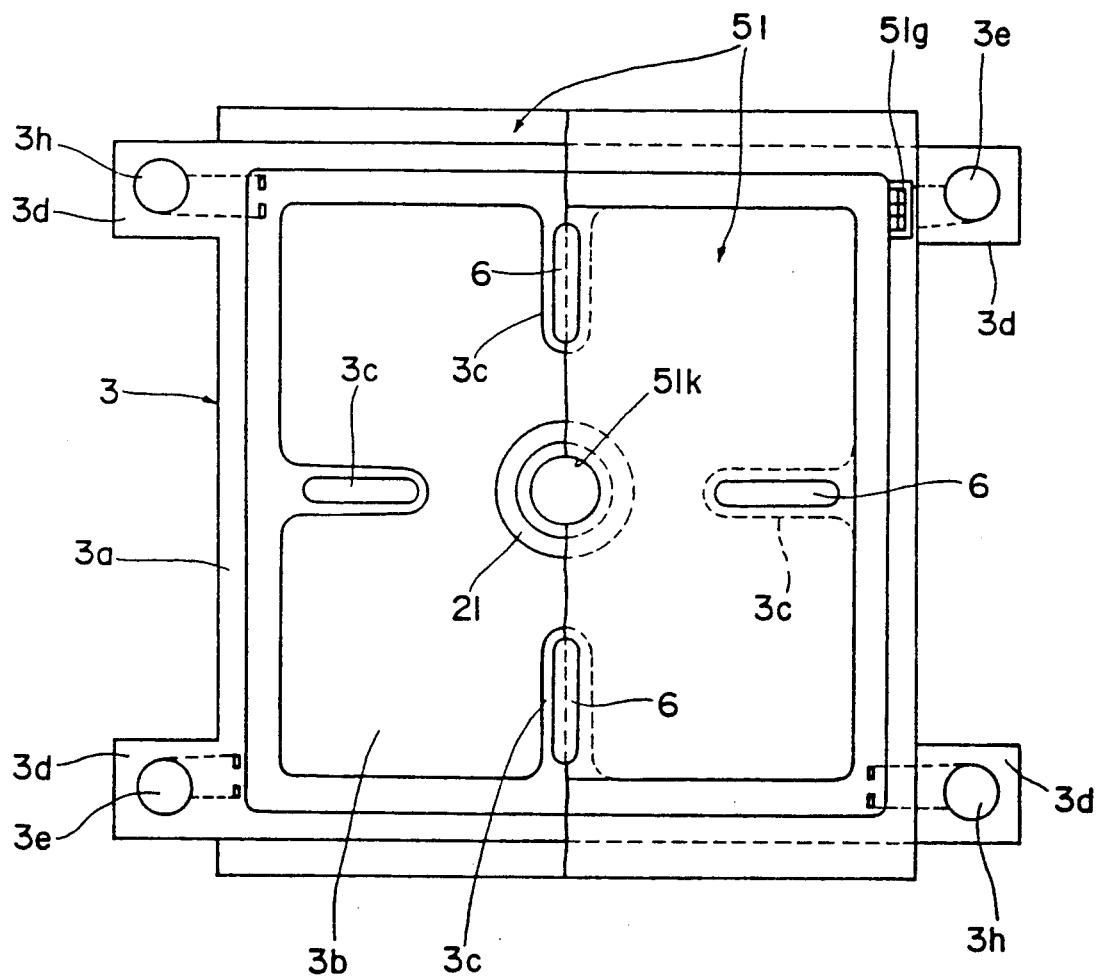
FIG. 26 is a front view of a pressing filter plate according to a further embodiment.
Figure 27:
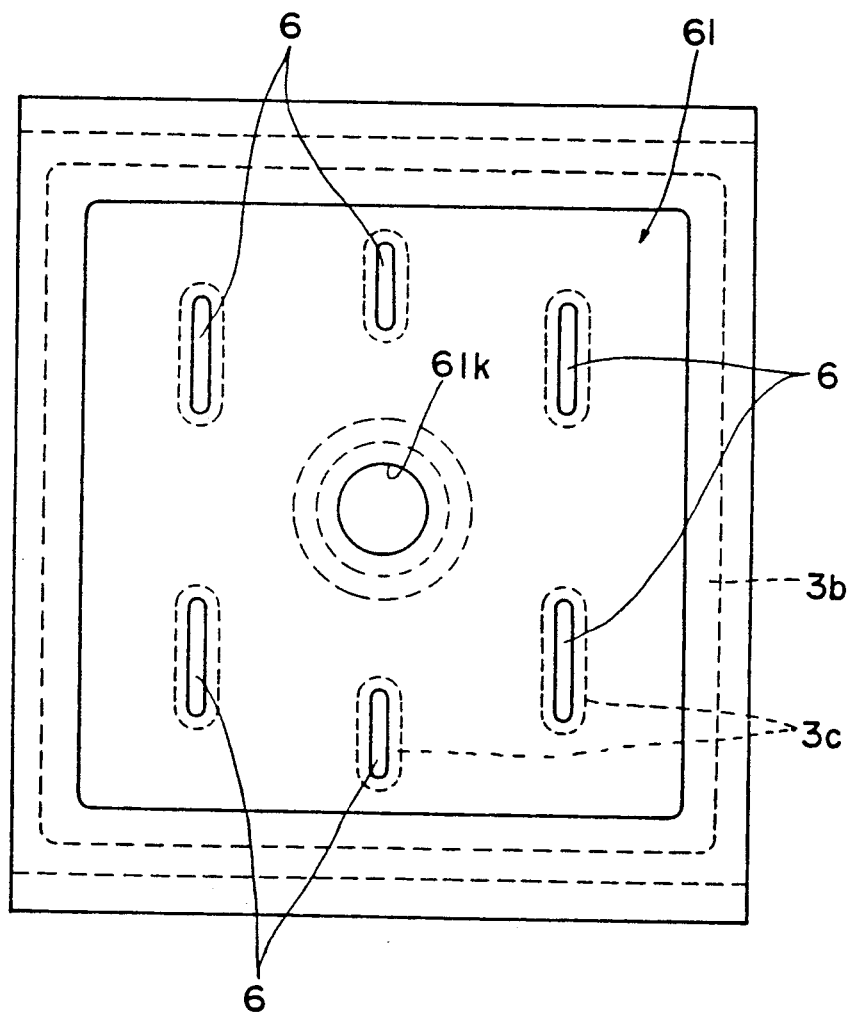
FIG. 27 is a front view of a further embodiment of a pressing filter plate in which the relationship between the pressing diaphragm and a pressing filter plate is shown by dotted lines.
Figure 35:
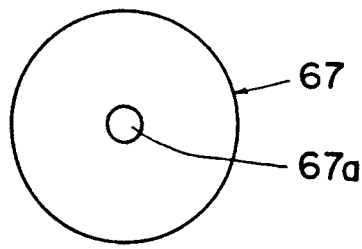
FIGS. 34 and 35 are, respectively, a rear elevation view of the projection member as taken in the direction of arrows VIII—VIII in FIG. 33 and a rear elevation view of the projection member mounting plate as taken in the direction of arrows IX—IX in FIG. 33.
Figure 32:
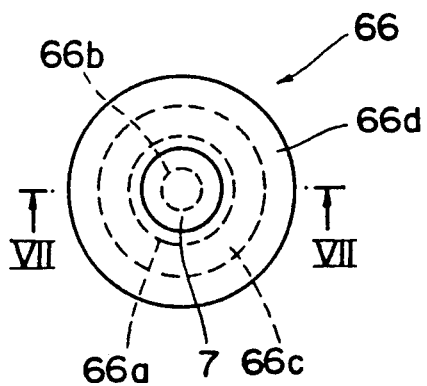
FIG. 32 is a front view of a projection member and a projection member mounting plate mounted together with a bolt.
Figure 34:
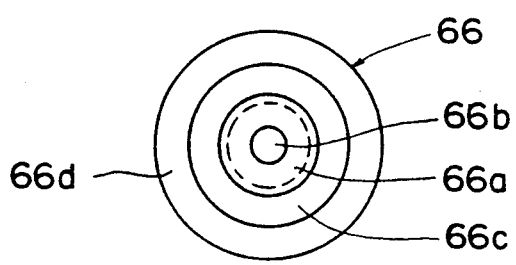
Figure 33:
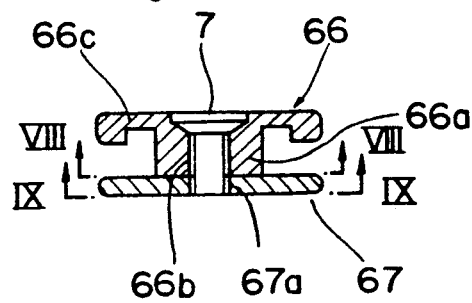
FIG. 33 is a sectional view taken along line VII—VII shown in FIG. 32.
Figure 39:
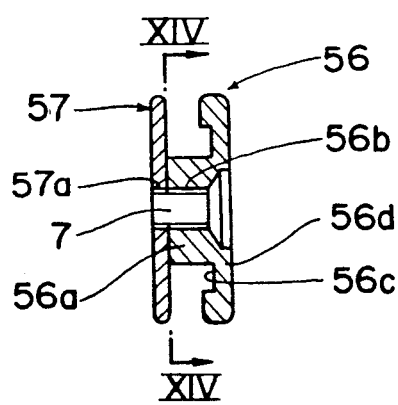
FIGS. 38 and 39 are a side view of the projection member and the projection member mounting plate shown in FIG. 37, and a sectional view taken along line XII—XII in FIG. 37, respectively.
Figure 37:
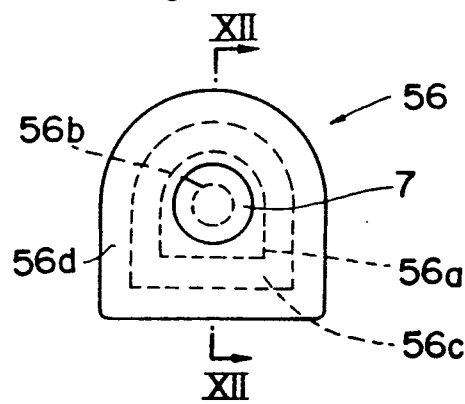
FIG. 37 is a plan view of another embodiment of a projection member and a projection member mounting plate mounted together with a bolt.
Figure 40:
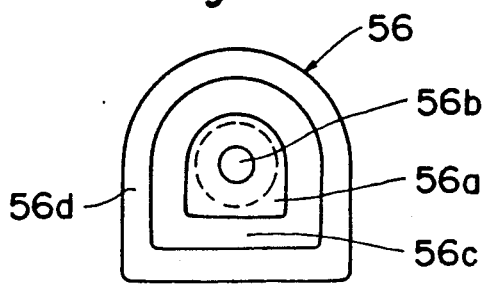
FIG. 40 is a rear elevation view of the projection member as taken in the direction of arrows XIV—XIV in FIG. 39.
Figure 38:
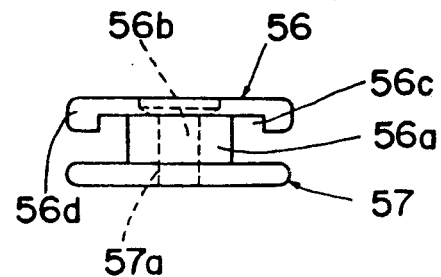

Further, the position of each of the projection members 6, 36, and 46 and the projection member mounting plates 27 on the filtering face is arbitrary. For example, as shown in FIG. 26, in the pressing filter plate main body 3, the projecting portion 3c can be formed integrally with the outer frame 3a. That is, each projecting portion 3c can be formed radially with respect to a slurry supply opening 51k, i.e., a respective projecting portion 3c can extend from the upper, lower, left, and right sides of the outer frame 3a, and the projection members 6, 36, 46, and the projection member mounting plates 27 can be mounted in the pressing diaphragm 51 in correspondence with each projecting portion 3c. In FIG. 26, reference numeral 51g corresponds to the opening 1g of the pressing diaphragm 1. As shown in FIG. 27, three projecting portions 3c can be formed to the upper and lower sides of a slurry supply opening 61k and the projection members 6, 36, 46, and the projection mounting plate 27 can be mounted in a pressing diaphragm 61 in correspondence with each projecting portion 3c.

The number of the projection member mounting plates 27 for mounting each projection member 6, 36, and 46 to a membrane of a pressing diaphragm is not limited to one, and the configuration thereof is not limited to being approximately rectangular with both end portions thereof curved, but a plurality of projection member mounting plates 27 can be provided. That is, the pillars 6a, 36a, and 46a of each of the projection members 6, 36, and 46 can be mounted on one projection member mounting plate 27 of an arbitrary configuration, for example, a circular configuration.

Other embodiments according to the present invention are described in detail with reference to FIGS. 28 through 45. Hereinafter, the parts different from those in the above embodiments will be mainly described.

In the pressing filter plate 2 according to an embodiment shown in FIG. 28, the front and rear surfaces of a square filter plate main body 3 are covered with a pair of pressing diaphragms 1, three projection members 66 are located on the front surface of the membrane of each pressing diaphragm 1 along the diagonals of the pressing diaphragm 1, projection member mounting plates 67 each serving as a projection member mounting member are provided on the rear surface of each membrane of the pressing diaphragm 1 in correspondence with the projection members 66, and each projection member 66 is mounted on the projection member mounting plate 67 with the membrane of the pressing diaphragm 1 sandwiched therebetween.

When the filter plates are clamped, the projecting portion 3c space the filtering faces 3b and 4b apart in cooperation with the three projection members 66, the three projection member mounting plates 67, and the projecting portion 4c of the filter plate 4, thus preventing the filtering faces 3b and 4b from breaking.

In each pressing diaphragm 1, the three projection members 66 and the three projection member mounting plates 67 are located a predetermined distance radially outward of the periphery of the slurry supply opening 1k at positions corresponding to the locations of the projecting portions 3c, respectively. A filtrate collecting opening 1g communicating with an opening 3g of the outer frame 3a of the main body 3 is formed in the pressing diaphragm 1 at the lower left and upper right corners thereof.

Next, the relationship between the membrane of the pressing diaphragm 1 and each projection member 66 as well as each projection member mounting plate 67 will be described with reference to FIGS. 29 through 36. In the embodiment to be described below, the arrangement and position of the projection members 66, the projection member mounting plates 67, and the bolts 7 are different from those of the embodiment shown in FIG. 28. In the embodiment to be described below, four projection members 66 and four projection member mounting plates 67 are provided.

In FIGS. 29 through 36, a circular projecting portion 61e is formed on the portion of the pressing diaphragm 61 in which each projection member 66 is provided, and a circular projection member fit-in concave portion 61d is formed inside the circular projecting portion 61e. The circular projection member fit-in concave portion 61d has a configuration conforming to that of the projection member 66 and defines a small through-hole 61a therethrough.

Preferably, each projection member 66 is made of a hard material, such as stainless steel or nylon and has a circular configuration as shown in FIGS. 29 through 34. Preferably, the thickness of the projection member 66 is so determined that the surface of the projection member 66 almost coincides with that of the outer frame 3a of the main body 3 when the projection member 66 is fitted in the projection member fit-in concave portion 61d of the pressing diaphragm 61. Each projection member 66 comprises a circular pillar 66a, a flange 66d projecting from the pillar 66a, a mounting hole 66b extending through the center of the pillar 66a, and an engaging concave portion 66c forming a rear surface of the flange 66d. Each pillar 66a is provided with the flange 66d at one end thereof and is fitted in the circular through-hole 61a of the pressing diaphragm 61, whereby the other end thereof contacts the projection member mounting plate 67. The engaging concave portion 66c tightly engages the circular projection portion 61c and allows a close contact between the membrane of the pressing diaphragm 61 and the projection member 66, thus effectively preventing the leakage of compressed air from the inside of the pressing diaphragm 61 to the outside thereof or the leakage of the filtrate from the outside of the pressing diaphragm 61 to the inside thereof when the pressing diaphragm expands.

As shown in FIGS. 30 through 33 and FIG. 35, the projection member mounting plate 67 has approximately the same flat configuration as the projection member 66.

The filtering operation of this embodiment is similar to that of the previously described embodiment.

According to the above embodiment, the projection member 66 comprises the pillar 66a, the flange 66d extending from the pillar 66a, the mounting hole 66b, and the engaging concave portion 66c. The projection member 66 is mounted on the membrane of the pressing diaphragm 1 with the projection member mounting plate 67 and the bolts 7 in such a manner that the membrane is sandwiched between the projection member 66 and the projecting member mounting plate 67, and the projection member 66 is not fixed to the pressing filter plate main body 3. Consequently, with the expansion of the pressing diaphragm 1, the projection member 66 is capable of freely moving with respect to the pressing filter plate main body 3 without restricting the expansion of the pressing diaphragm 1. Therefore, when the pressing diaphragm 1 expands, the sudden increase of a load on the pressing diaphragm 1 positioned in the vicinity of the projection member is suppressed, so that the membrane of the pressing diaphragm 1 can be effectively prevented from cracking. Specifically, each pillar 66a is inserted into each through-hole 1a of the pressing diaphragm 1 and the projection member 66 is mounted on the projection member mounting plate 67 with the bolts 7 so that the membrane of the pressing diaphragm 1 is sandwiched between the projection member 66 and projection member mounting plate 67. As a result, when the filter plates are clamped, even though pressure is applied from the adjacent filter plate 4 to the pressing diaphragm 1, the pressure acts on the projection member 66 and the projection member mounting plate 67 via the pillars 66a while the pressure hardly acts on the pressing diaphragm 1. Accordingly, when the filter plates are clamped, the pressing diaphragm 1 can be effectively prevented from being damaged. Since the projecting portions 3c and 4c and the projection member 66 are disposed radially with respect to the slurry supply openings 3k and 4k toward the corners of the filtering faces 3b and 4b, the slurry can be smoothly supplied to the corners of the filtering faces 3b and 4b. Since the projection member 66 and the projection member mounting plate 67 are provided in a well-balanced and symmetrical alignment on both surfaces of the main body 3, an approximately uniform clamping force is applied to the filtering faces 3a and 4a when the adjacent filter plates 2 and 4 are clamped. Further, since the pressing filter plate main body 3 is not required to be provided with a mounting hole for mounting the projection member 66, the pressing filter plate main body 3 can be manufactured rather easily. In addition, an effect similar to that of the embodiment as shown in FIGS. 29 through 36 can be obtained in the embodiment shown in FIG. 28.

The present invention is not limited to the above embodiment, but can be embodied in various other ways.

The configuration of each projection member is not limited to a circular configuration, but can be any arbitrary configuration. For example, as shown by the two-dot chain line in the upper portion of FIG. 29, a projection member 56 can be formed by making the upper end thereof circular and the lower end thereof square as shown in FIGS. 37 through 40. In this case, preferably, the projection member mounting plate 57 has a similar configuration. In the projection member 56, the upper half of the engaging concave portion 56c has an arcuate configuration, the lower half thereof has a partial quadrangular configuration, and the engaging projecting portion 61c of the pressing diaphragm 61 has a similar configuration so that both the engaging concave portion 56c and the engaging projecting portion 61c tightly engage with each other, thus effectively preventing the leakage of the filtrate from the front surface of the pressing diaphragm 61 to the rear surface thereof or the leakage of the compressed fluid from the rear surface thereof to the front surface thereof. In this projection member 56, the pillar 56a, the mounting hole 56b, the flange 56d, and the engaging concave portion 56c correspond to the pillar 66a, the mounting hole 66b, the flange 66d, and the engaging concave portion 66c, respectively of the projection member 66. The mounting hole 57a of the projection mounting plate 57 corresponds to the mounting hole 67a of the projection mounting plate 67.

Figure 41:
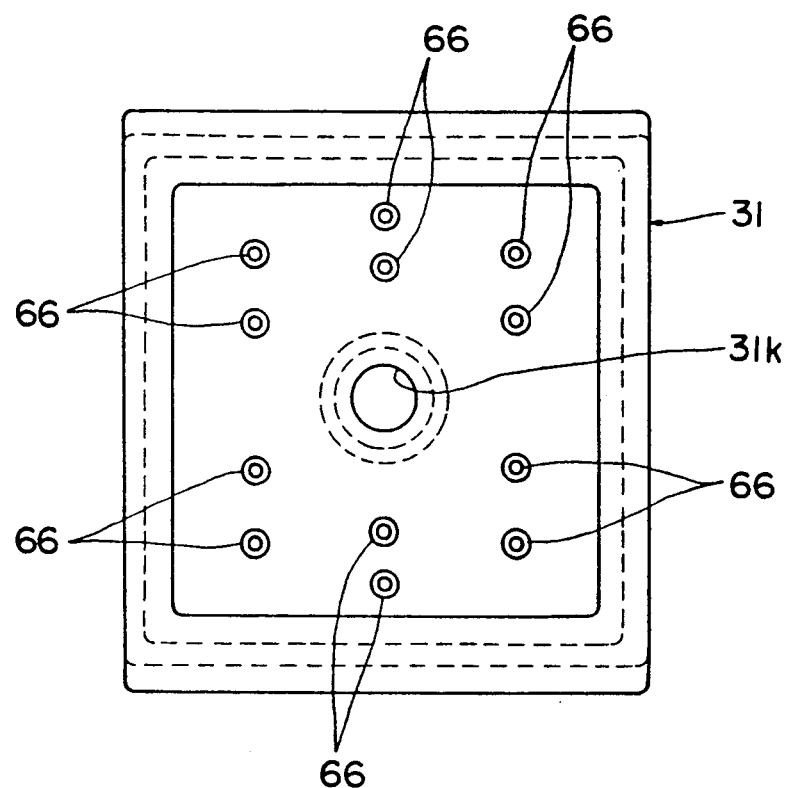
FIGS. 41, 42, and 43 are, respectively, a front view of another embodiment of a pressing diaphragm in which a projection member and a projection member mounting plate are mounted on a pressing membrane, an enlarged front view of a part of the diaphragm of FIG. 41, and a side sectional view of the pressing filter plate with the projection member and the projection member mounting plate mounted thereon clamped to the normal filter plate.
Figure 42:
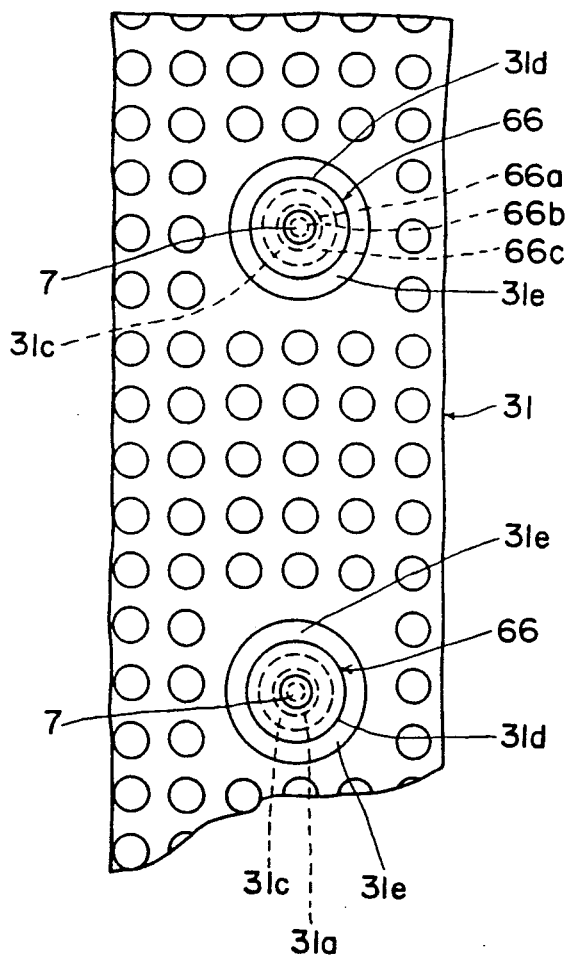
Figure 43:
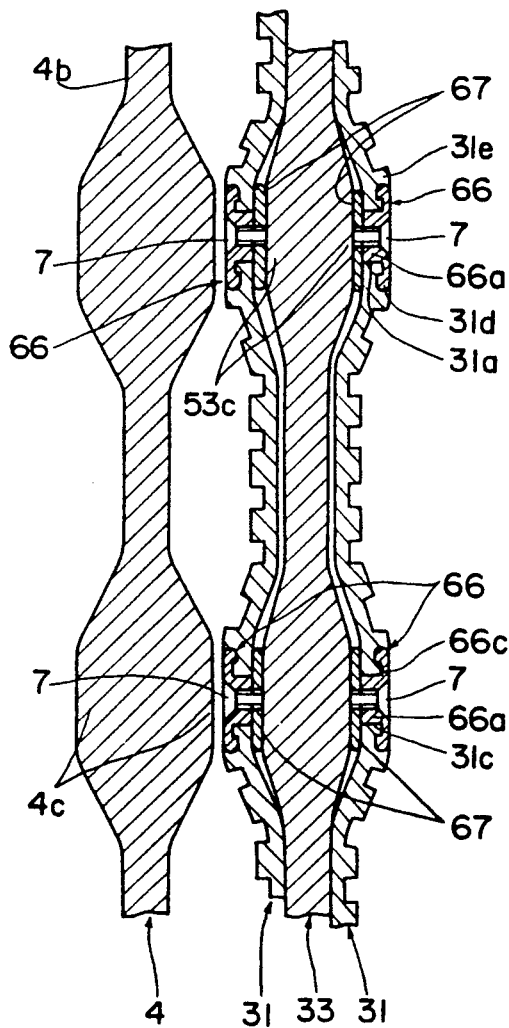
Figure 44:
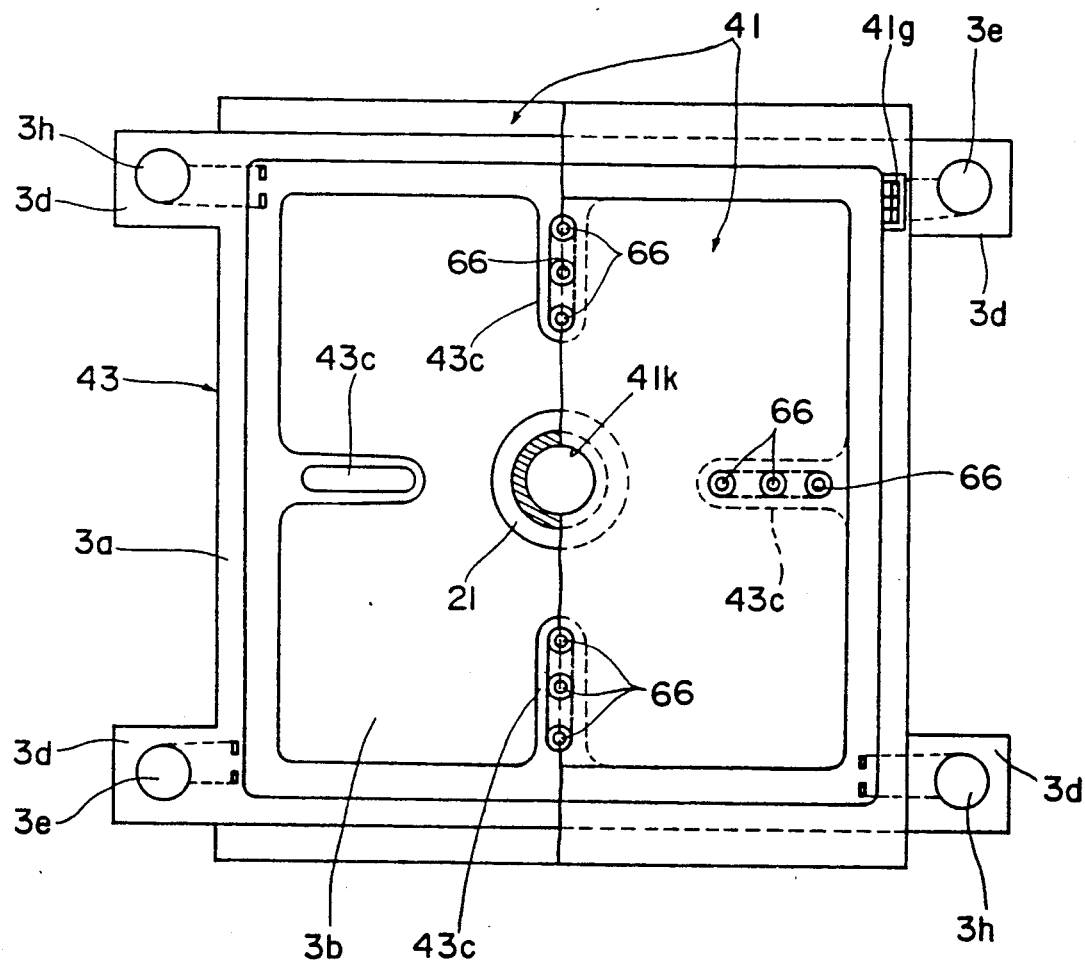
FIG. 44 is a front view of still a further embodiment of a pressing filter plate.
Figure 45:
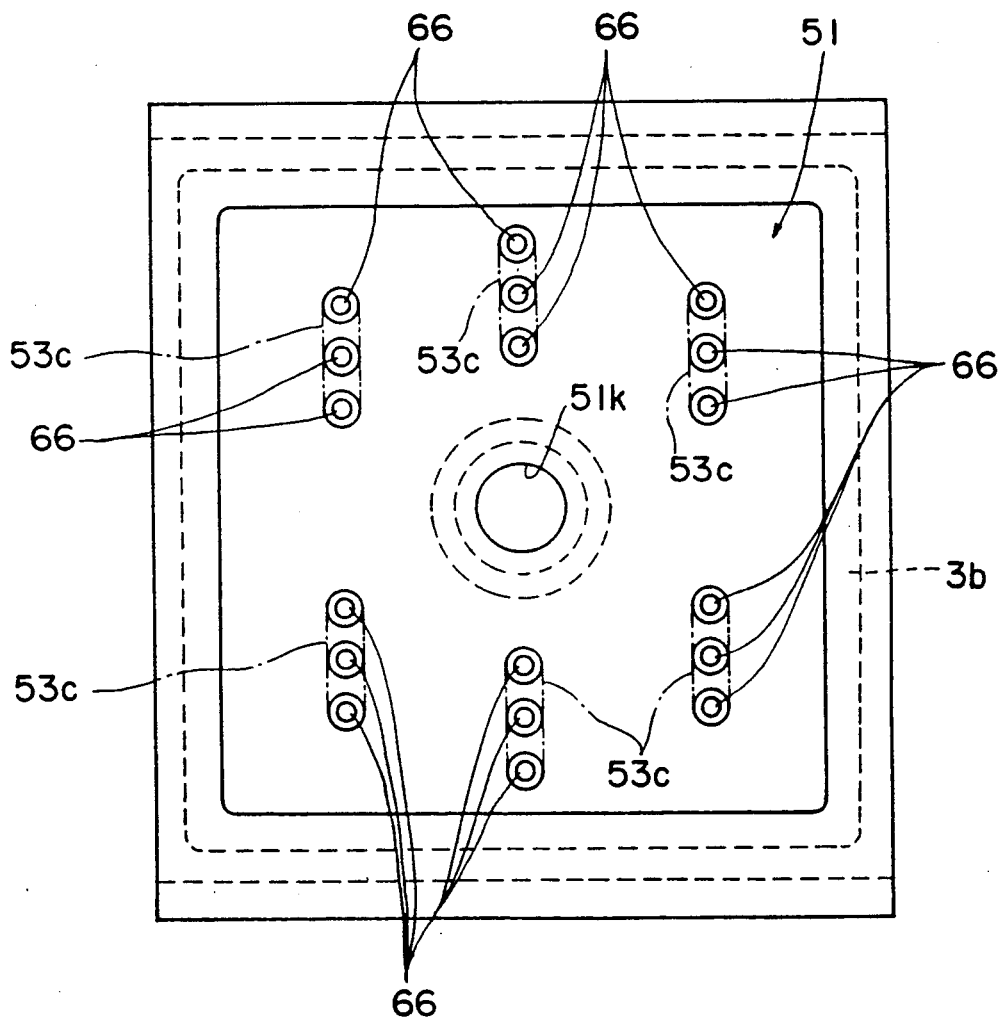
FIG. 45 is a front view of still a further embodiment of a pressing diaphragm, showing the relationship between the pressing diaphragm and a pressing filter plate with dotted lines.

The position of each of the projection members 66 and 56 and the projection member mounting plates 67 and 57 on the filtering face is arbitrary. For example, as shown in FIGS. 41 through 43, it is possible to form six circular projecting portions 53c to each of the upper and lower sides of a slurry supply opening 31k and to mount a respective projection member 66 and projection member mounting plate 67 in the pressing diaphragm 31 in correspondence with each projecting portion 53c. In this case, the through-hole 31a, engaging projecting portion 31c, fit-in concave portion 31d, and circular projecting portion 31e of the pressing diaphragm 31 correspond to the through-hole 61a, engaging projecting portion 61c, fit-in concave portion 61d, and circular projecting portion 61e of the pressing diaphragm 61, respectively. Further, as shown in FIG. 44, in the pressing filter plate main body 43, the projecting portion 43c can be formed integrally with the outer frame 3a. That is, long projecting portions 43c are formed radially with respect to a slurry supply opening 41k, i.e., respective projecting portions 43c extend from the upper, lower, left, and right sides of the outer frame 3a, and three projection members 66 and three projection member mounting plates 67 can be mounted in the pressing diaphragm 41 in correspondence with each projecting portion 43c. In FIG. 44, reference numeral 41g designates an opening corresponding to the opening 1g of the pressing diaphragm 1. As shown in FIG. 45, three long projecting portions 53c can be formed to each of the upper and lower sides of a slurry supply opening 51k, and three projection members 66 and projection member mounting plates 67 can be mounted in a pressing diaphragm 51 in correspondence with each projection portion 53c.

Further, instead of mounting one projection member 66 or 56 on the projection member mounting plates 67 or 57, a plurality of projection members 66 or 56 ca be mounted on a projection member mounting plate which consists of an approximately rectangular plate curved at both end portions thereof.

Other embodiments according to the present invention are described in detail with reference to FIGS. 46 through 54. Hereinafter, the parts different from those of the above embodiments will be mainly described.

Figure 46:
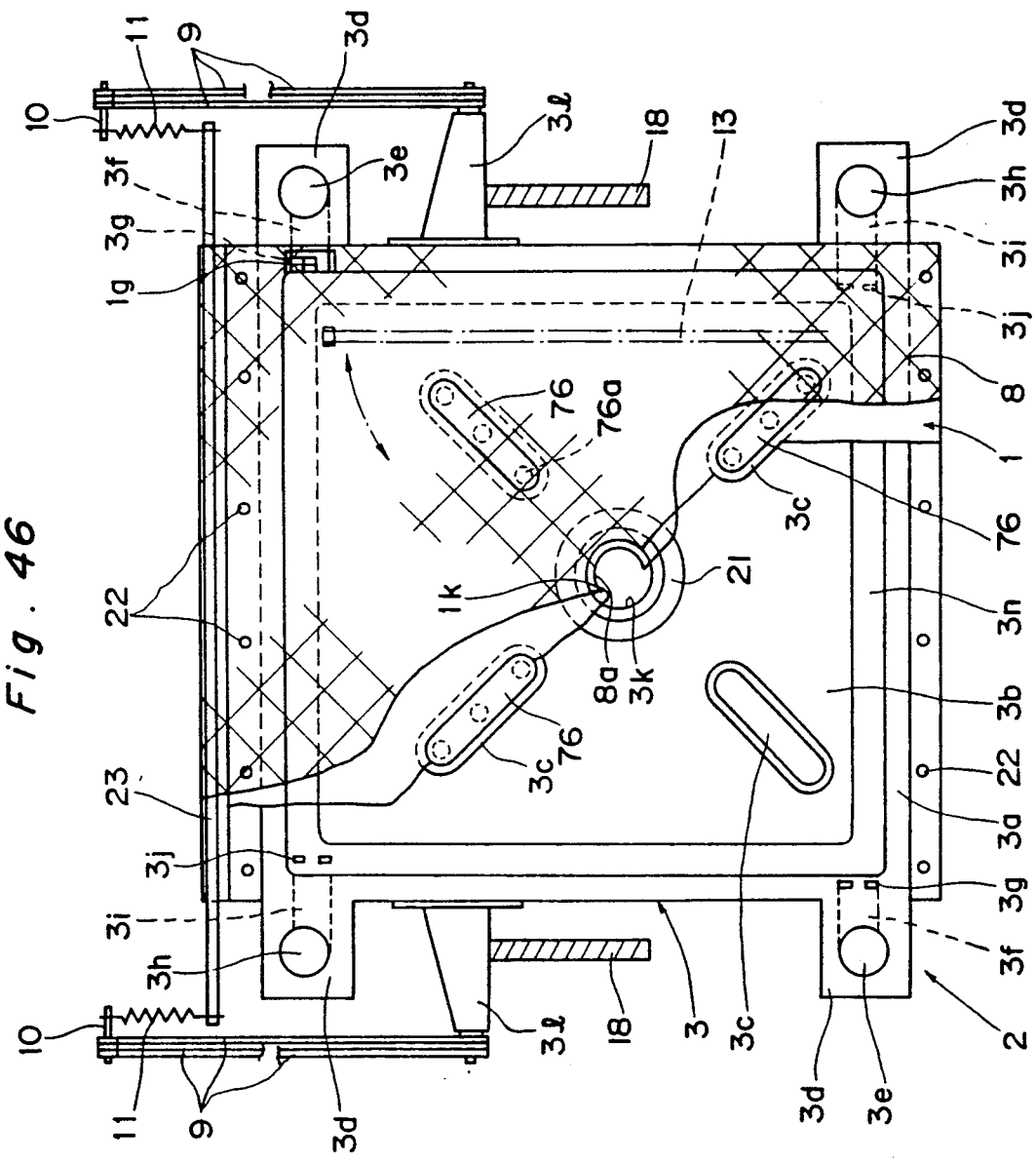
FIG. 46 is a sectional view of a filter press having a pressing filter plate according to the present invention.
Figure 48:
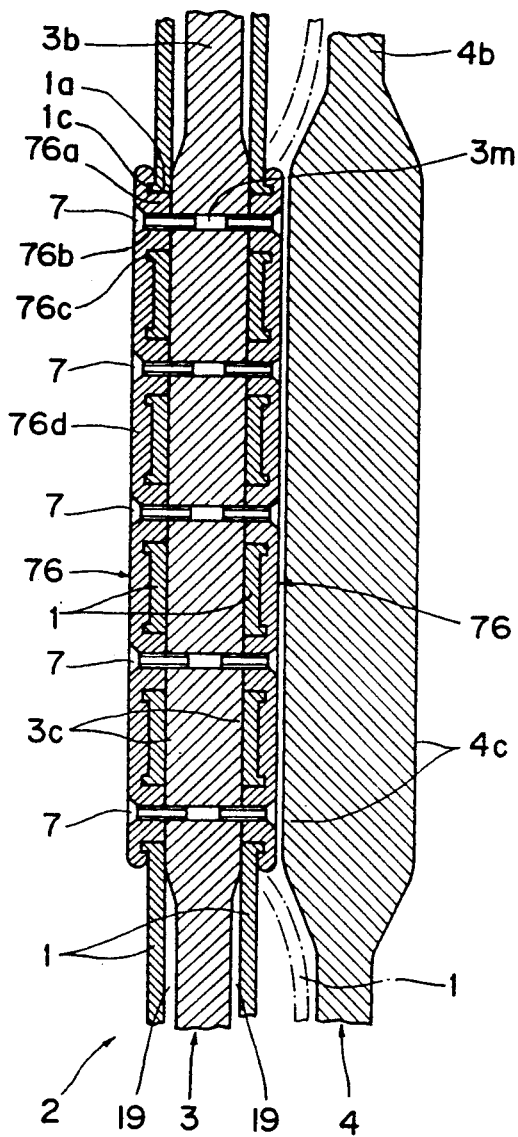
FIGS. 47, 48, and 49 are, respectively a front view of a projection member mounted on a pressing membrane, a side elevation sectional view and a cross-sectional view of filter plates clamped together.
Figure 47:
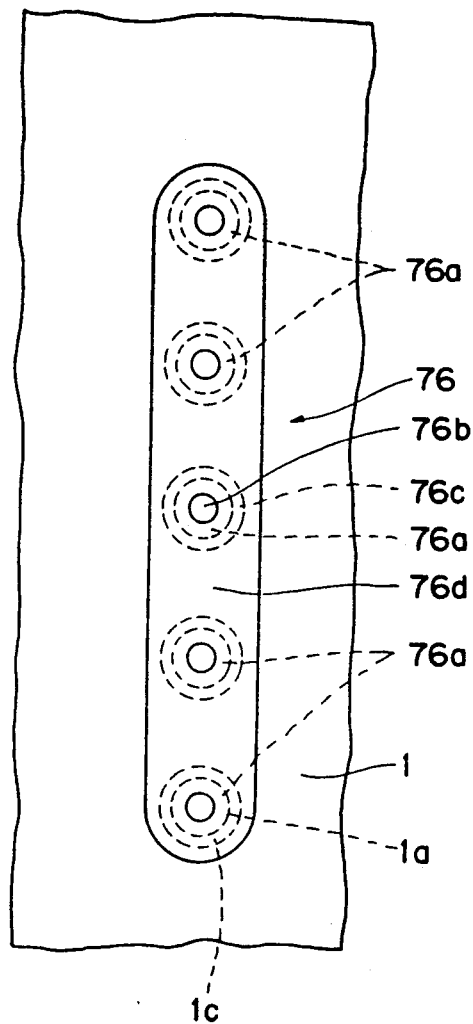
Figure 49:
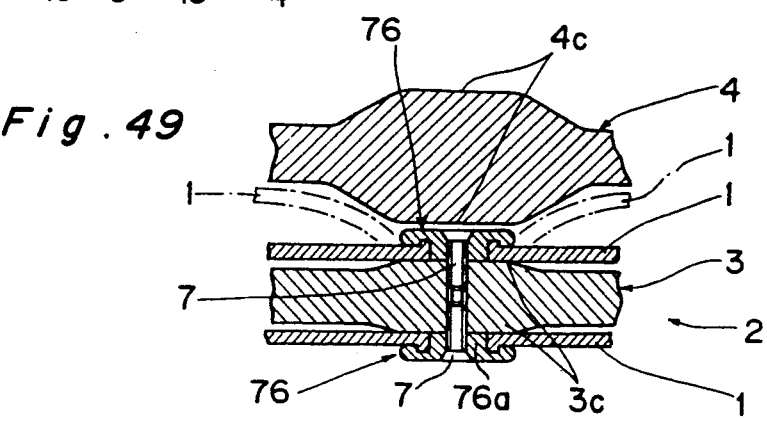

The pressing filter plate 2 according to the embodiment shown in FIGS. 46, 47, and 49 comprises a square plate-shaped filter plate main body 3, and a pair of diaphragms 1 covering the front and rear surfaces of the main body 3 and fixed to the main body 3 by bolts 7 threaded to the projecting portion 3c of the main body 3. At this time, although the membrane of the pressing diaphragm 1 is sandwiched between the projection member 76 and the main body 3, the membrane is not damaged by the bolts 7 because the pressing diaphragm 1 is not sandwiched between the portions of projection member 76 and the main body 3 secured directly together by the bolts 7, namely, between the pillar 76a and the projecting portion 3c. The projection member 76 can be reliably fixed to the projecting portion 3c by making the projecting portion 3c a little larger than the projection member 76. The projection member 76 is mounted on the membrane of the pressing diaphragm 1 with five bolts 7 in this embodiment; however, it can be mounted thereon with only the upper and lower bolts 7 shown in FIG. 48. Preferably, the projection members 76 are spaced from the periphery of the slurry supply opening 3k of the filtering face 3b of the main body 3 in a well-balanced arrangement.

The through-hole of each ear on the upper left and the lower right corners of the normal filter plate 4 is connected with an opening of the inclined face of the normal filter plate through a connecting passage so as to constitute a compressed fluid supply passage communicating with the compressed fluid supply passage of the pressing filter plate 2. The through-hole of each ear on the lower left and upper right corners of the filter plate 4 is connected with an opening of the outer frame of the normal filter plate 4 through a connecting passage so as to constitute a filtrate collecting passage communicating with the filtrate collecting passage of the pressing filter plate 2.

When the filter plates 2 and 4 are clamped, the projection member 76 fixed to the projecting portion 3c of the pressing filter plate main body 3 contacts the projecting portion 4c of the normal filter plate 4 adjacent thereto through the pair of filter cloths 8.

Figure 50:
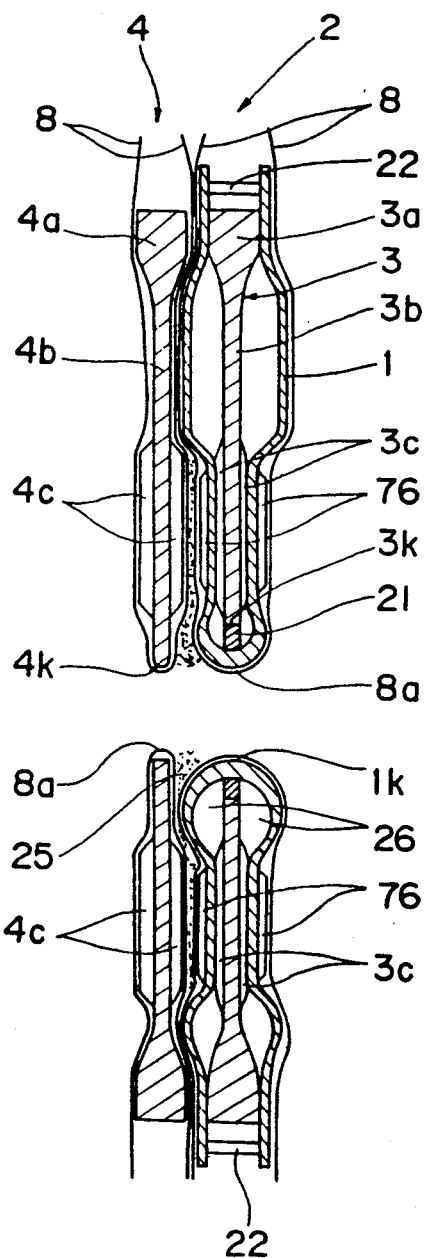
FIG. 50 is a side elevation sectional view of a part of the filter press in which the filter plates are clamped together.

In the filtering operation, as shown in FIG. 50, compressed fluid is supplied to the compressed fluid supply chamber 26 defined between the pressing diaphragm 1 and the pressing filter plate main body 3, with the result that the pressing diaphragm 1 expands, except at the portion thereof fixed to the projecting portion 3e, and the cake held between both filter cloths 8 is compressively filtered. The remaining operation is similar to that in the previously described embodiments.

According to the above embodiment, since the projection member 76 comprises a plurality of pillars 76a connected to each other by the long connecting plate 76d, and the pressing diaphragm 1 is fixed to the pressing filter plate main body 3, the pressing diaphragm 1 does not expand at the entire periphery of each pillar 76a but only at a part thereof as the long connecting plate 76d prevents the expansion of a remaining portion of the pressing diaphragm 1. Therefore, when the pressing diaphragm 1 expands, only a relatively small load is applied to the pressing diaphragm 1 in the vicinity of the projection member, so that the membrane of the pressing diaphragm 1 can be effectively prevented from cracking. Further, the pressing diaphragm 1 is not fixed to the pressing filter plate main body 3 by a small circular member; rather, the pressing diaphragm 1 is fixed to the main body 3 by the projection member 76 so that the contact area between the pressing diaphragm 1 and the main body 3 is relatively large without experiencing a reduction in the filtering area and the membrane of the pressing diaphragm 1 can be effectively prevented from cracking. In addition, since the projecting portions 3c and 4c and the projection member 76 are positioned radially with respect to the slurry supply openings 3k and 4k toward the corners of the filtering faces 3b and 4b, the slurry can be smoothly supplied to the corners of the filtering faces 3b and 4b.

The present invention is not limited to the above embodiments, but can be embodied even in various other ways.

In each projection member, the engaging concave portions 76c is not necessarily provided around the periphery of each pillar 76a, but one engaging concave portion 86c can surround an arbitrary number of pillars. That is, for example, as shown in FIGS. 51 through 54, five pillars 86a are surrounded with one engaging concave portion 76c. In this projection member 86, a pillar 86a, a mounting hole 86b, and a connecting plate 86d correspond to the pillar 76a, the mounting hole 76b, and the connecting plate 76d of the projection member 76, respectively. The engaging concave portion 86c extends along the periphery of the projection member 86 in an approximately rectangular path with upper and lower end portions thereof curved as shown in FIG. 51 and frames the pillars 86a. In correspondence with the engaging concave portion 86c, an engaging projecting portion 1d approximately rectangular but curved at upper and lower end portions thereof as shown in FIG. 51 surrounds the five through-holes 1a of the pressing diaphragm 1. Accordingly, the engaging projecting portion 1d of the pressing diaphragm 1 is fitted into the engaging concave portion 86c of the projection member 86 in close contact therewith. The present invention is not limited to the above embodiments, but can be embodied in even various other ways. For example, the configuration of each projection member is not limited to that in the above embodiments, but can vary when they are long as in the embodiments shown in FIGS. 1-27 and 46-54. In addition, the number of projection members is arbitrary. The number of bolts for mounting each projection member to the projection member mounting plate is arbitrary or the number of bolts for mounting each projection member to the pressing filter plate is arbitrary. The number of the pillars is arbitrary. The projecting portion of the main body of the pressing filter plate and/or the projecting portion of the normal filter plate can be eliminated by making the projection member and/or the projection member mounting plate thicker. The position of the slurry supply opening of each of the normal and pressing filter plates is not limited to approximately the center of the filtering faces thereof. Rather, the slurry supply opening can be located at any desired portion of the filtering face or on the outer frame so that it communicates with the filtering face. Further, the pressing filter plate and the normal filter plate are not necessarily alternately disposed, but only the pressing filter plates can be provided.

Further, each of the projection members 36, 46, 66, 56, 76, and 86 can have engaging projecting portions whereas each of the pressing diaphragms 1, 31, 41, and 61 will have engaging concave portions.

The position of each of the projection members 66, 56, 76, and 86 and the projection member mounting plates 27, 67, and 57 on the filtering face is arbitrary, as shown in FIGS. 26 and 27 in the above embodiments.

In order to project the surface of each of the projection members 6, 36, 46, 66, and 56 from the surface of the pressing diaphragms 1, 31, 41, 51, and 61, respectively, each of the projection members 6, 36, 46, 66, and 56 can be fitted in the projection engaging concave portions of each of the pressing diaphragms 1, 31, 41, 51, and 61.

Instead of screwing the bolts 7 into the mounting holes 27a, 67a, and 57a formed on the projection member mounting plates 27, 67, and 57, respectively, the bolts 7 can be fixed to the projection member mounting plates 27, 67, and 57, and after the bolts 7 are inserted through the projection members 6, 36, 46, 66 and 56, the bolts can be secured in place with nuts.

The material of the projection member mounting plates 27, 67, and 57 is not limited to being elastic, but the projection member mounting plates 27, 67, and 57 can be of a material bendable between the adjacent pillars 6a and 6a, 36a and 36a, 46a and 46a, 66a and 66a, and 56a and 56a, respectively, so that the projection member mounting plates 27, 67, and 57 can be bendable between the pillars in correspondence with the expansion of the pressing diaphragm in order to reduce a load on the pressing diaphragm.

Although the present invention has been fully described in connection with the preferred embodiments thereof with reference to the accompanying drawings, it is to be noted that various changes and modifications will become apparent to those skilled in the art. Such changes and modifications are to be understood as included within the scope of the present invention as defined by the appended claims unless they depart therefrom.

What is claimed is:

1. A pressing diaphragm for covering a surface of a main body of a pressing filter plate in a compression type of filter press, the pressing diaphragm comprising:
   a pressing membrane having a plurality of through-holes extending therethrough;
   a projection member provided on a front surface of said membrane;
   a projection member mounting plate provided on a rear surface of said membrane at a position corresponding to that at which the projection member is mounted on said front surface;
   the projection member having a plurality of pillars mounted on the projection member mounting plate and extending through said through-holes of the pressing diaphragm, respectively, a mounting hole extending through each of said pillars, and a long connecting plate connecting said pillars to each other and regulating the expansion of portions of said membrane located adjacent the periphery of said pillars;
   the projection member mounting plate having a mounting portion; and
   a fixture extending through each said mounting hole of the pillars, received by the mounting portion of the projection member mounting plate, and securing said projection member to said projection member mounting plate.

2. The pressing diaphragm as claimed in claim 1, wherein a slurry supply opening extends through said membrane at approximately a center of said front surface of said pressing membrane, the projection member and the projection member mounting plate are spaced from the periphery of the slurry supply opening, and the projection member and the projection member mounting member extend radially with respect to the slurry supply opening.

3. The pressing diaphragm as claimed in claim 2, wherein the pressing membrane has an engaging portion surrounding said through-holes, and the projection member further comprises an engaging portion tightly engaging the engaging portion of the pressing membrane.

4. The pressing diaphragm as claimed in claim 1, wherein the pressing membrane has an engaging portion surrounding said through-holes, and the projection member further comprises an engaging portion tightly engaging the engaging portion of the pressing membrane.

5. A pressing filter plate of a compression type of filter press, said pressure filter plate comprising:
   a filter plate main body; and
   a pressing diaphragm covering a surface of said filter plate main body, said pressing diaphragm including a membrane having a plurality of through-holes extending therethrough, a projection member provided on a front surface of said membrane facing away from said surface of the filter plate main body, said projection member including a plurality of pillars extending through the through-holes of said membrane and each of said pillars having a mountain hole extending therethrough, and a long connecting plate located adjacent said front surface and connecting the pillars with each other and regulating expansion of portions of said pressing membrane located adjacent the periphery of said pillars.

6. The pressing filter plate as claimed in claim 5, wherein said pressing diaphragm covering the surface of the filter plate main body is fixed to the main filter plate body by said projection member; wherein said membrane has an engaging portion surrounding the through-holes; wherein the projection member further comprises an engaging portion tightly engaging said engaging portion of said membrane; and wherein the pressing diaphragm further comprises a fixture extending through the mounting hole of each of said pillars and fixing the projection member to the main filter plate body.

7. The pressing filter plate as claimed in claim 6, wherein a slurry supply opening is provided in approximately a center of the filter plate main body, the projection member is spaced from the periphery of the slurry supply opening, and the projection member extends radially with respect to the slurry supply opening.

8. The pressing filter plate as claimed in claim 7, wherein the engaging portion of the projection member surrounds said pillars and tightly contacts the engaging portion of said membrane.

9. The pressing filter plate as claimed in claim 6, wherein the engaging portion of the projection member surrounds said pillars and tightly contacts the engaging portion of said membrane.

10. The pressing filter plate as claimed in claim 5,
   wherein said pressing diaphragm further includes a projection member mounting plate provided on a rear surface of the pressing membrane at a position corresponding to that at which the projection member is mounted on said front surface, and a fixture mounting said projection member to said projection mounting plate with the projection member and the projection member mounting plate sandwiching the pressing membrane therebetween; and
   wherein the pillars of the projection member are mounted on the projection member mounting plate, the projection member mounting plate has a mounting portion receiving the fixture, and said fixture extends through the mounting hole of each pillar of the projection member.

11. The pressing filter plate as claimed in claim 10, wherein a slurry supply opening extends through said membrane at approximately a center of the main filter plate body and said front surface of the pressing diaphragm, the projection member and the projection member mounting plate are spaced radially from the periphery of the slurry supply opening, and the projection member and the projection member mounting plate extend radially with respect to the slurry supply opening.

12. The pressing filter plate as claimed in claim 11, wherein the pressing membrane has an engaging portion surrounding the through-holes, and the projection member has an engaging portion tightly engaging the engaging portion of said pressing diaphragm.

13. The pressing filter plate as claimed in claim 10, wherein the pressing membrane has an engaging portion surrounding the through-holes, and the projection member has an engaging portion tightly engaging the engaging portion of said pressing diaphragm.

14. A pressing filter plate of a compression type of filter press
   said pressing filter plate comprising:
   a pressing diaphragm covering a surface of said filter plate main body;
   said pressing diaphragm including a pressing membrane having a through-hole extending therethrough and an engaging portion extending around the periphery of said through-hole on a front surface of said body.
   a projection member provided on said front surface, said projection mounting member having a pillar extending through the through-hole of said pressing membrane,
   a flange extending from the pillar, a mounting hole extending through the pillar, and an engaging portion formed adjacent the flange and tightly engaging said engaging portion of the membrane extending around the periphery of said through-hole,
   a projection member mounting plate located between said surface of the filter plate main body and a rear surface of said membrane and having a mounting portion, and
   a fixture extending through the mounting hole in said pillar, received by said mounting portion of the projection member mounting plate, and securing said projection member and said projection member mounting plate together.

15. The pressing filter plate as claimed in claim 14 wherein a slurry supply opening extends through said membrane at approximately a center of said front surface of the pressing diaphragm, the projection member and the projection member mounting member are spaced from the periphery of the slurry supply opening, and the projection member and the projection member mounting member extend radially with respect to the slurry supply opening.

16. The pressing filter plate as claimed in claim 15, and further comprising at least one other projection member and projection member mounting plate, having the same structure as said projection member and said projecting member mounting plate, provided on the surfaces of said pressing membrane, respectively.

17. The pressing filter plate as claimed in claim 14, and further comprising at least one other projection member and projection member mounting plate, having the same structure as said projection member and said projecting member mounting plate, provided on the surfaces of said pressing membrane, respectively.

18. A pressing diaphragm for covering a surface of a main body of a pressing filter plate in a compression type of filter press, the pressing diaphragm comprising:

a pressing membrane having a through-hole extending therethrough and an engaging portion extending around said through-hole; and means for freely moving relative to the pressing filter plate which the pressing diaphragm is to cover without influencing the expansion of said pressing membrane, said means including a projection member provided on a front surface of said membrane, a projection member mounting plate provided on a rear surface of said membrane at a position corresponding to that at which the projection member is mounted on said front surface, the projection member having a pillar mounted on the projection member mounting plate and extending through said through-hole of the pressing membrane, a flange extending from the pillar, a mounting hole extending through the pillar, and an engaging portion formed adjacent the flange and tightly engaging said engaging portion of the membrane extending around the periphery of said through-hole, the projection member mounting plate having a mounting portion, and a fixture extending through the mounting hole in said pillar, engaged with said mounting portion of the projection member mounting plate, and securing said projection member and said projection member mounting plate together.

19. The pressing diaphragm as claimed in claim 18, wherein a slurry supply opening extends through said membrane at approximately a center of said front surface of the pressing membrane, the projection member and the projection member mounting plate are spaced from the periphery of the slurry supply opening, and the projection member and the projection member mounting plate extend radially with respect to the slurry supply opening.

20. The pressing filter plate as claimed in claim 19, and further comprising at least one other projection member and projection member mounting plate, having the same structure as said projection member and said projecting member mounting plate, provided on the surfaces of said pressing membrane, respectively.

21. The pressing filter plate as claimed in claim 18, and further comprising at least one other projection member and projection member mounting plate, having the same structure as said projection member and said projecting member mounting plate, provided on the surfaces of said pressing membrane, respectively.

* * * * *